US011959307B2

(12) United States Patent
Minter et al.

(10) Patent No.: US 11,959,307 B2
(45) Date of Patent: Apr. 16, 2024

(54) LEVER ACTION AUTOMATIC SHOOTBOLT OPERATOR WITH MAGNETICALLY-TRIGGERED LOCKING MECHANISM

(71) Applicant: Interlock USA, Inc., Reno, NV (US)

(72) Inventors: Peter J. Minter, Reno, NV (US); Douglas Stadler, Reno, NV (US); Marc Wesley Fullenwider, Reno, NV (US); Anthony J. Frabbiele, Reno, NV (US)

(73) Assignee: INTERLOCK USA, INC., Reno, NV (US)

( * ) Notice: Subject to any disclaimer, the term of this patent is extended or adjusted under 35 U.S.C. 154(b) by 0 days.

(21) Appl. No.: 17/940,653

(22) Filed: Sep. 8, 2022

(65) Prior Publication Data

US 2023/0003053 A1 Jan. 5, 2023

Related U.S. Application Data

(63) Continuation of application No. 16/654,512, filed on Oct. 16, 2019, now Pat. No. 11,479,989, which is a (Continued)

(51) Int. Cl.
*E05B 47/00* (2006.01)
*E05B 47/02* (2006.01)

(Continued)

(52) U.S. Cl.
CPC ........ *E05B 47/0002* (2013.01); *E05B 47/004* (2013.01); *E05B 47/023* (2013.01);

(Continued)

(58) Field of Classification Search
CPC . E05C 1/00; E05C 1/004; E05C 1/006; E05C 1/08; E05C 1/12; E05C 1/14;

(Continued)

(56) References Cited

U.S. PATENT DOCUMENTS 2,672,745 A 3/1954 Marchetti
4,025,096 A * 5/1977 Geer .......................... E05C 9/02 292/341.18

(Continued)

FOREIGN PATENT DOCUMENTS

DE 2909299 A * 9/1980 ............... E05C 9/04
DE 3801441 A1 9/1988

(Continued)

OTHER PUBLICATIONS

Machine translation for WO0043624A1 (Year: 2000).*

(Continued)

*Primary Examiner* — Christine M Mills
*Assistant Examiner* — Christopher F Callahan
(74) *Attorney, Agent, or Firm* — DeLio Peterson & Curcio LLC; David R. Pegnataro

(57) ABSTRACT

A magnetically-triggered lock mechanism for interengaging two relatively movable components. The lock mechanism includes a bolt mounted within a first component composed of a first material and displaceable between retracted and extended positions to interengage with a second component when the first and second components are in a predetermined position relative to each other and the bolt is extended, and a magnetically-releasable latch mechanism positioned to latch the bolt in a retracted position, the latch mechanism including a first magnet and mounted for movement between a biased latch engaging position and a latch releasing position. A support collar composed of a second material having higher strength than that of the first material is disposed around the bolt between an inner casing and outer casing of the first component and is spaced from the bolt to allow for sliding movement of the bolt through the support collar as the bolt moves between the extended and retracted positions. The support collar absorbs and distrib- (Continued)

utes to the inner and/or outer casing a load generated from the bolt as the bolt moves to the extended position through the support collar. A second magnet is positioned to displace the latch mechanism to the latch releasing position when the first component is in the predetermined position relative to the second component.

17 Claims, 24 Drawing Sheets

Related U.S. Application Data continuation-in-part of application No. 15/995,970, filed on Jun. 1, 2018, now Pat. No. 11,111,696.

(60) Provisional application No. 62/838,717, filed on Apr. 25, 2019, provisional application No. 62/812,751, filed on Mar. 1, 2019, provisional application No. 62/746,320, filed on Oct. 16, 2018, provisional application No. 62/513,680, filed on Jun. 1, 2017.

(51) Int. Cl.

| | |
|---|---|
| ***E05C 9/04*** | (2006.01) |
| ***E05C 9/12*** | (2006.01) |
| ***E05C 9/20*** | (2006.01) |
| ***E05C 19/16*** | (2006.01) |

(52) U.S. Cl.

CPC ................ *E05C 9/041* (2013.01); *E05C 9/12* (2013.01); *E05C 9/20* (2013.01); *E05C 19/168* (2013.01); *E05B 2047/0008* (2013.01)

(58) Field of Classification Search

CPC . E05C 1/145; E05C 7/04; E05C 7/045; E05C 9/00; E05C 9/02; E05C 9/021; E05C 9/04; E05C 9/041; E05C 9/10; E05C 9/12; E05C 9/20; E05C 9/22; E05C 17/02; E05C 17/04; E05C 17/12; E05C 17/20; Y10T 292/0834; Y10T 292/0836; Y10T 292/0838; Y10T 292/0843; Y10T 292/0844; Y10T 292/0841; Y10T 292/0845; Y10T 292/0696; Y10T 292/097; Y10T 292/0972; Y10T 292/0992; Y10T 292/0993; Y10T 292/0994; Y10T 292/0995; Y10S 292/15

See application file for complete search history.

(56) References Cited

U.S. PATENT DOCUMENTS

| | | | |
|---|---|---|---|
| 5,377,513 | A | 1/1995 | Miyamoto et al. |
| 5,823,026 | A | 10/1998 | Finke |
| 6,474,120 | B1 | 11/2002 | Wadsworth et al. |
| 8,177,265 | B2 | 5/2012 | Stevens |
| 8,382,168 | B2 | 2/2013 | Carabalona et al. |
| 8,702,133 | B2 | 4/2014 | Sun et al. |
| 8,764,071 | B2 | 7/2014 | Lanigan et al. |
| 2002/0195828 | A1 | 12/2002 | Gebhard |
| 2004/0239121 | A1 | 12/2004 | Morris |
| 2006/0220391 | A1 | 10/2006 | Gonzalez |
| 2007/0194578 | A1 | 8/2007 | Boosey et al. |
| 2008/0115543 | A1 | 5/2008 | Lanigan et al. |
| 2009/0115204 | A1 | 5/2009 | Rycroft |
| 2010/0263415 | A1 | 10/2010 | Ruspil |
| 2011/0277517 | A1 | 11/2011 | Aschieri |
| 2012/0167646 | A1 | 7/2012 | Sharma et al. |
| 2012/0204490 | A1 | 8/2012 | Lanigan et al. |
| 2015/0033808 | A1 | 2/2015 | Taylor et al. |
| 2015/0330126 | A1 | 11/2015 | Ma et al. |
| 2015/0354251 | A1 | 12/2015 | Woo |
| 2018/0080257 | A1 | 3/2018 | Risi |

FOREIGN PATENT DOCUMENTS

| | | | | | |
|---|---|---|---|---|---|
| DE | 19847043 | A1 * | 12/1999 | ............... E05C 1/06 |
| DE | 10036945 | A1 * | 2/2002 | ............. E05B 77/42 |
| DE | 202015000208 | U1 * | 6/2015 | ......... E05B 17/2034 |
| DE | 102017127576 | A1 * | 5/2019 | ............. E05C 7/045 |
| EP | 0786574 | A1 * | 11/1996 | |
| EP | 2453086 | A1 * | 5/2012 | ............... E05C 7/04 |
| EP | 4095339 | A1 * | 11/2022 | |
| FR | 2713267 | A1 | 6/1995 | |
| GB | 2286627 | A | 8/1995 | |
| JP | 06299750 | A1 | 10/1994 | |
| JP | 11101044 | A1 | 4/1999 | |
| WO | WO-0043624 | A1 * | 7/2000 | ............... E05C 1/06 |
| WO | 2006070062 | A1 | 7/2006 | |
| WO | WO-2008135567 | A2 * | 11/2008 | ......... E05B 65/1006 |
| WO | 2009050328 | A1 | 4/2009 | |
| WO | WO-2014094071 | A1 * | 6/2014 | ........... E05B 47/004 |

OTHER PUBLICATIONS

Machine translation for WO2014094071A1 (Year: 2014).*
Machine translation for DE10036945 (Year: 2002).*
Machine translation for DE2909299A1 (Year: 1980).*

* cited by examiner

LEVER ACTION AUTOMATIC SHOOTBOLT OPERATOR WITH MAGNETICALLY-TRIGGERED LOCKING MECHANISM

BACKGROUND OF THE INVENTION

1. Field of the Invention

The present invention relates generally to a lever action operator and triggered bolt assembly for engaging two relatively movable components. More specifically, the present invention relates to a concealed lever mechanism for driving a magnetically-triggered bolt assembly for engaging a window or door with a strike or frame to prevent access to the interior of an enclosure.

2. Description of Related Art

Bolt assemblies are a well-known means for preventing access to the interior of an enclosure or structure. Known bolt assemblies comprise two components, one of which is connected to one component of an enclosure, such as a door or window frame, and the other connected to the other component, such as a door. The first component typically includes a bolt displaceable between engaged and disengaged positions, and the second component comprises a socket into which the bolt may be extended when the two components are in an appropriate position relative to each other and the bolt is moved to the engaged position. The position of the bolt may be controlled manually by manipulation of a key or by energizing an interlock circuit so as to prevent opening of the enclosure except in predetermined safe conditions.

However, known bolt assemblies have disadvantages. For example, in bolt assemblies including a key, if the key is actuated to extend the bolt in circumstances where it is presumed that the two components of the bolt assembly are interengaged by the bolt but in fact the two components are not interengaged, unsafe conditions may prevail despite the bolt being extended. In a two component bolt assembly, it is not sufficient to ensure simply that the bolt is extended, as it may be that the bolt when extended has not engaged the other component of the assembly.

Therefore, there is a need for an improved bolt assembly which ensures that the bolt will not be triggered and extended until the two components are in the appropriate position relative to each other.

SUMMARY OF THE INVENTION

Bearing in mind the problems and deficiencies of the prior art, it is therefore an object of the present invention to provide an improved concealed lever operator for applying a tension force to one or more pliable connectors.

It is another object of the present invention to provide an improved concealed lever operator for a bolt assembly which utilizes a lever on a two bar linkage to drive a series of rack and pinion gears to create a mechanical advantage to retract and/or extend shoot bolts.

A further object of the invention is to provide an improved concealed lever operator for a bolt assembly which may be configured with additional mechanisms to allow locking and unlocking from the interior, operation from the exterior, locking and unlocking from the exterior, and any other combination of mechanisms.

It is another object of the present invention to provide an improved triggered bolt assembly for preventing access to the interior of an enclosure.

It is still another object of the present invention to provide an improved bolt assembly which ensures that the bolt is extended only after the two components are in the appropriate position relative to each other.

A further object of the present invention is to provide a magnetically-triggered bolt assembly which ensures that the bolt is extended only after the two components are in the appropriate position relative to each other.

Yet another object of the present invention is to provide a magnetically-triggered bolt assembly including an anti-tampering back drive prevention subassembly.

Still yet another object of the present invention is to provide a magnetically-triggered bolt assembly including a collapsible or adjustable strike.

Still another object of the present invention is to provide an improved bolt assembly including a support collar for absorbing and distributing load generated from the bolt as the bolt moves to the extended position through the support collar.

Yet another object of the present invention is to provide a method for operating a magnetically-triggered bolt assembly.

Still yet another object of the present invention is to provide a method for assembling a lock mechanism in a door or window panel.

Still other objects and advantages of the invention will in part be obvious and will in part be apparent from the specification.

The above and other objects, which will be apparent to those skilled in the art, are achieved in the present invention which is directed, in a first aspect, to a magnetically-triggered lock mechanism for interengaging two relatively movable components. The lock mechanism comprises a bolt displaceable between extended and retracted positions, the bolt mounted within a first component and interengageable with a second component when the first and second components are in a predetermined position relative to each other and the bolt is extended, and a magnetically-releasable latch mechanism positioned to latch the bolt in a retracted position, the latch mechanism including a first magnet and mounted for movement between a biased latch engaging position and a latch releasing position in a non-common direction of movement of the bolt. The lock mechanism further comprises a second magnet positioned to displace the latch mechanism to the latch releasing position when the first component is in the predetermined position relative to the second component. The first and second magnets may be positioned to displace the latch mechanism to the latch releasing position as a result of magnetic repulsion when the first component is in the predetermined position relative to the second component.

The magnetically-releasable latch mechanism may comprise a locking shuttle in communication with a trigger housing and the first magnet may be positioned within the trigger housing. The locking shuttle is adapted to move in a direction perpendicular to the movement of the trigger housing as the latch mechanism moves between the biased latch engaging position and the latch releasing position. The trigger housing may include at least one angled surface for mating with an angled surface of the locking shuttle, wherein the mating angled surfaces of the trigger housing and locking shuttle translate vertical movement of the trigger housing into horizontal movement of the locking shuttle when the first component is in the predetermined position relative to the second component and the first and second magnets are positioned to displace the latch mechanism to the latch releasing position. The locking shuttle may further comprise a projection and the bolt may further comprise an aperture for receiving the locking shuttle projection when the latch mechanism is in the biased latch engaging position.

In one embodiment, the first component may be a door or window panel, and the second component may be a frame associated with the door or window panel, and the second magnet may be at least partially located within a recess in the frame.

The bolt may be normally biased toward the extended position, and the lock mechanism may further include an outer housing comprising a channel in an inner surface thereof, wherein the bolt translates vertically within the channel as the bolt moves between extended and retracted positions.

In another aspect, the present invention is directed to a door or window assembly comprising a door or window panel moveable relative to an associated frame, and a magnetically-triggered lock mechanism for interengaging the panel and the frame. The lock mechanism comprises a bolt displaceable between extended and retracted positions, the bolt mounted within the door or window panel and interengageable with the frame when the door or window panel and frame are in a predetermined position relative to each other and the bolt is extended, and a magnetically-releasable latch mechanism positioned to latch the bolt in a retracted position, the latch mechanism including a first magnet and mounted for movement between a biased latch engaging position and a latch releasing position in a non-common direction of movement of the bolt. The lock mechanism further includes a second magnet positioned to displace the latch mechanism to the latch releasing position when the door or window panel is in the predetermined position relative to the frame. The first and second magnets may be positioned to displace the latch mechanism to the latch releasing position as a result of magnetic repulsion when the door or window panel is in the predetermined position relative to the frame.

In still another aspect, the present invention is directed to a method of interengaging two relatively movable components to prevent access to an interior of an enclosure. The method comprises the steps of providing a bolt displaceable between extended and retracted positions, the bolt mounted within a first component and interengageable with a second component when the first and second components are in a predetermined position relative to each other and the bolt is extended; providing a magnetically-releasable latch mechanism positioned to latch the bolt in a retracted position, the latch mechanism including a first magnet and mounted for movement between a biased latch engaging position and a latch releasing position in a non-common direction of movement of the bolt; and providing a second magnet positioned to displace the latch mechanism to the latch releasing position when the first component is in the predetermined position relative to the second component. The method further comprises locating the first and second components in the predetermined position relative to each other; causing the latch mechanism to move to the latch releasing position as a result of magnetic interaction between the first and second magnets; and displacing the bolt to the extended position to interengage the second component. In an embodiment, the magnetic interaction between the first and second magnets may comprise magnetic repulsion. The first component may be a door or window panel, and the second component may be a frame associated with the door or window panel.

The latch mechanism may comprise a locking shuttle in communication with a trigger housing and the first magnet may be positioned within the trigger housing, and the step of causing the latch mechanism to move to the latch releasing position as a result of magnetic interaction between the first and second magnets may further comprise moving the locking shuttle in a direction perpendicular to the movement of the trigger housing as the latch mechanism moves between the biased latch engaging position and the latch releasing position.

The locking shuttle may comprise a projection and the bolt may comprise an aperture for receiving the locking shuttle projection when the latch mechanism is in the biased latch engaging position, and the step of causing the latch mechanism to move to the latch releasing position as a result of magnetic interaction between the first and second magnets may further comprise retracting the locking shuttle projection from the bolt aperture to allow the bolt to be displaced to the extended position.

The trigger housing may include at least one angled surface for mating with an angled surface of the locking shuttle, and the step of causing the latch mechanism to move to the latch releasing position as a result of magnetic interaction between the first and second magnets may further comprise translating vertical movement of the trigger housing into horizontal movement of the locking shuttle via the mating angled surfaces of the trigger housing and locking shuttle as the latch mechanism moves to the latch releasing position.

In still yet another aspect, the present invention is directed to a magnetically-triggered lock mechanism including a back drive prevention subassembly. The lock mechanism comprises a bolt displaceable between extended and retracted positions, the bolt mounted to a first component and interengageable with a second component when the first and second components are in a predetermined position relative to each other and the bolt is extended; a rack disposed on the first component; a pawl or pinion gear connected to and rotatable relative to the bolt, the pawl or pinion gear engaging the rack and rotatable to permit the bolt to move between the extended and retracted positions; and a slack block connected to the bolt and movable relative to the pawl or pinion gear between a first position permitting rotation of the pawl or pinion gear and a second position preventing rotation of the pawl or pinion gear, wherein when the first and second components are in the predetermined position the bolt may be moved to the extended position to engage the second component, and wherein when the slack block is moved from the first position to the second position the pawl or pinion gear is prevented from rotation with respect to the rack and the bolt is prevented from movement from the extended position to the retracted position, whereby the first component may not move from the predetermined position relative to the second component.

In an embodiment, the lock mechanism may further include a second gear moveable with the pawl or pinion gear, and the slack block may include a pawl engageable with the second gear when the slack block is in the second position to prevent movement of the pawl or pinion gear and the bolt. The pawl or pinion gear and the second gear may be disposed on a rotatable shaft, and the second gear may include non-symmetric teeth to permit the pawl to slide along the tooth surface in one direction of rotation of the pawl or pinion gear, and in the other direction to permit the pawl to engage the opposite side of the tooth surface and prevent rotation of the pawl or pinion gear. The lock mechanism may further include a spring biasing the slack block toward the second position preventing rotation of the pawl or pinion gear. The spring may bias the bolt toward the extended position engaging with the second component. The slack block may be slideable with respect to the bolt between the second and first positions in the same direction as movement of the bolt, and may be moveable by operation of a cable between the second position and the first position. The cable may extend within the first component to the slack block, and the cable may be pulled to effect movement of the slack block from the second position to the first position permitting rotation of the pawl or pinion gear. Subsequent to the cable being pulled to effect movement of the slack block from the second position to the first position permitting rotation of the pawl or pinion gear, the slack block may engage the bolt to effect movement of the bolt from the extended position to the retracted position as the cable is continued to be pulled. The first component may be a door or window panel, and the second component may be a frame associated with the door or window panel. The slack block may include a fastener for connecting the cable to the slack block.

In yet another aspect, the present invention is directed to a method of interengaging two relatively movable components to prevent access to an interior of an enclosure, comprising the steps of: providing a lock mechanism having a bolt displaceable between extended and retracted positions, the bolt mounted to a first component and interengageable with a second component when the first and second components are in a predetermined position relative to each other and the bolt is extended; a rack disposed on the first component; a pawl or pinion gear connected to and rotatable relative to the bolt, the pawl or pinion gear engaging the rack and rotatable to permit the bolt to move between the extended and retracted positions; and a slack block connected to the bolt and movable relative to the pawl or pinion gear between a first position permitting rotation of the pawl or pinion gear and a second position preventing rotation of the pawl or pinion gear, moving the first and second components to the predetermined position; moving the bolt to the extended position to engage the second component; and moving the slack block from the first position to the second position to prevent the pawl or pinion gear from rotation with respect to the rack and preventing the bolt from movement from the extended position to the retracted position, whereby the first component may not move from the predetermined position relative to the second component.

In an embodiment, the method may further include a second gear moveable with the pawl or pinion gear, and a pawl on the slack block engageable with the second gear, and further including engaging the slack block pawl with the second gear when the slack block is moved to the second position to prevent movement of the pinion gear and the bolt. The pawl or pinion gear and the second gear may be disposed on a rotatable shaft, and the second gear may include non-symmetric teeth to permit the pawl to slide along the tooth surface in one direction of rotation of the pawl or pinion gear, and in the other direction to permit the pawl to engage the opposite side of tooth surface and prevent rotation of the pawl or pinion gear. The method may further include using a spring to move the slack block toward the second position preventing rotation of the pawl or pinion gear. The method may still further include using a spring to move the bolt toward the extended position engaging with the second component. The slack block may be slideable with respect to the bolt between the second and first positions in the same direction as movement of the bolt, and may include a cable extending within the first component and connected to the slack block, and may still further include pulling the cable to move the slack block from the second position to the first position permitting rotation of the pawl or pinion gear. Subsequent to the cable being pulled to effect movement of the slack block from the second position to the first position permitting rotation of the pawl or pinion gear, the method may include continuing to pull the cable to engage the slack block with the bolt and move the bolt from the extended position to the retracted position. The first component may be a door or window panel, and the second component is a frame associated with the door or window panel.

In yet another aspect, the present invention is directed to a magnetically-triggered lock mechanism including a collapsible or adjustable strike. The lock mechanism comprises: a bolt displaceable between extended and retracted positions, the bolt mounted within a first component and interengageable with a second component when the first and second components are in a predetermined position relative to each other and the bolt is extended; a magnetically-releasable latch mechanism positioned to latch the bolt in a retracted position, the latch mechanism including a first magnet and mounted for movement between a biased latch engaging position and a latch releasing position; an adjustable strike having a top portion and a base portion, the adjustable strike adapted to permit vertical translation of the top portion to adjust and maintain it within close proximity of the latch mechanism; and a second magnet positioned in the adjustable strike top portion to displace the latch mechanism to the latch releasing position when the first component is in the predetermined position relative to the second component.

In an embodiment, the first and second magnets may be positioned to displace the latch mechanism to the latch releasing position as a result of magnetic repulsion when the first component is in the predetermined position relative to the second component. The adjustable strike may further include a spring disposed between the adjustable strike top portion and base portion to bias the top portion away from the base portion. The adjustable strike may still further include an adjustment screw and nut extending through the top portion, a central axis of the spring, and the base portion, the adjustable screw and nut limiting the height of the adjustable strike. Rotation of the adjustment screw and nut may permit the vertical translation of the top portion towards or away from the base portion. The first component may be a door or window panel, and the second component may be a frame associated with the door or window panel. The bolt may normally be biased toward the extended position. The lock mechanism may further include an outer housing comprising a channel in an inner surface thereof, and wherein the bolt translates vertically within the channel as the bolt moves between extended and retracted positions.

In yet another aspect, the present invention is directed to a method of adjusting a strike for a magnetically-triggered lock mechanism for interengaging two relatively movable components, comprising: providing a bolt displaceable between extended and retracted positions, the bolt mounted within a first component and interengageable with a second component when the first and second components are in a predetermined position relative to each other and the bolt is extended; providing a magnetically-releasable latch mechanism positioned to latch the bolt in a retracted position, the latch mechanism including a first magnet and mounted for movement between a biased latch engaging position and a latch releasing position; providing an adjustable strike having a top portion and a base portion, the adjustable strike adapted to permit vertical translation of the top portion to adjust and maintain it within close proximity of the latch mechanism; providing a second magnet positioned in the adjustable strike top portion to displace the latch mechanism to the latch releasing position when the first component is in the predetermined position relative to the second component; and translating vertically the adjustable strike top portion towards or away from the base portion to position the second magnet in close proximity with the first magnet when the first component is in the predetermined position relative to the second component.

In an embodiment, the method may further include: providing a spring disposed between the adjustable strike top portion and base portion to bias the top portion away from the base portion. The adjustment screw and nut may further extend through the adjustable strike top portion, a central axis of the spring, and the bottom portion. The method may still further include: providing an adjustment screw and nut for limiting the height of the adjustable strike, the adjustment screw extending through the adjustable strike top portion and the base portion.

In yet another aspect, the present invention is directed to a magnetically-triggered lock mechanism including a load-bearing support collar. The lock mechanism comprises: a bolt displaceable between extended and retracted positions, the bolt mounted within a first component made of a first material and interengageable with a second component when the first and second components are in a predetermined position relative to each other and the bolt is extended; a magnetically-releasable latch mechanism positioned to latch the bolt in a retracted position, the latch mechanism including a first magnet and mounted for movement between a biased latch engaging position and a latch releasing position; a support collar composed of a second material having higher strength than that of the first material of the first component, the support collar disposed around the bolt mounted within the first component, the support collar further being spaced from the bolt to allow for sliding movement of the bolt through the support collar; and a second magnet positioned to displace the latch mechanism to the latch releasing position when the first component is in the predetermined position relative to the second component.

In an embodiment, the support collar absorbs and distributes a load generated from the bolt as it extends through the support collar when interengaging with the second component through the first component. The first component may further include an inner casing and an outer casing for housing the bolt, the support collar disposed between the inner casing and outer casing. The support collar may be attached between the inner casing and outer casing by at least one fastener.

In a further aspect, the present invention is directed to a method of absorbing and distributing a load generated by a magnetically-triggered lock mechanism for interengaging two relatively movable components, comprising: providing a bolt displaceable between extended and retracted positions, the bolt mounted within a first component made of a first material and interengageable with a second component when the first and second components are in a predetermined position relative to each other and the bolt is extended; providing a magnetically-releasable latch mechanism positioned to latch the bolt in a retracted position, the latch mechanism including a first magnet and mounted for movement between a biased latch engaging position and a latch releasing position; providing a support collar composed of a second material having higher strength than that of the first material of the first component, the support collar disposed around the bolt mounted within the first component, the support collar further being spaced from the bolt to allow for sliding movement of the bolt through the support collar; providing a second magnet positioned to displace the latch mechanism to the latch releasing position when the first component is in the predetermined position relative to the second component; moving the first and second components to the predetermined position; displacing the bolt to its extended position through the support collar; and absorbing and distributing a load generated from the bolt as it extends through the support collar when interengaging with the second component through the first component.

In an embodiment, the method may further include: providing an inner casing and an outer casing for housing the bolt; and disposing the support collar between the inner casing and outer casing. The support collar may be attached between the inner casing and outer casing by at least one fastener.

In yet another aspect, the present invention is directed to a method of assembling a lock mechanism in a door or window panel, comprising: providing a door or window panel having an opening for a lock mechanism for moving a bolt therein between a retracted position within the panel and an extended position engaging a frame associated with the door or window panel, an opening for an actuator for causing the bolt in the lock mechanism to move from the extended to the retracted position, and a cavity within the panel between the lock mechanism opening and the actuator opening; passing a cable through the cavity between the lock mechanism opening and the actuator opening; installing the actuator into the actuator opening; installing the lock mechanism into the lock mechanism opening; connecting the cable to one of the actuator or the lock mechanism; applying tension to the cable; connecting the cable to the other of the actuator or the lock mechanism; if necessary, trimming an excess cable length; and operating the actuator to move the bolt in the lock mechanism by movement of the cable therebetween.

In an embodiment, the method may further include providing a fastener for connecting the cable to the lock mechanism, and tightening the fastener to connect the cable to the lock mechanism.

In still yet another aspect, the present invention is directed to a concealed lever operator for applying a tension force to one or more pliable connectors. The lever operator comprises: a casing; first and second sliders disposed within the casing, the first and second sliders translatable between first and second relative positions; at least one linkage coupling the first slider to the second slider, such that translation of the first slider in a first direction causes the second slider to move in a second direction different than the first direction; a linkage arm pivotally attached at one end to the casing at a first pivot point, and pivotally attached at the other end to a lever or handle at a second pivot point; the lever or handle in pivotal communication with the first slider at a point proximate one end of the lever or handle at a third pivot point, and in pivotal communication with the linkage arm at an intermediate point on the lever or handle at the second pivot point; and one or more pliable connectors attached at one end to the second slider. An opposite end of the one or more pliable connectors may be attached to a lock mechanism, such as a shootbolt assembly. When the lever or handle is rotated from a first position to a second position, the linkage arm pivots about the first and second pivot points causing the first and second sliders to translate between the first and second relative positions, the second slider applying a tension force to the one or more pliable connectors as the second slider translates to the second relative position.

In an embodiment, the lever operator may further include a spring normally biasing the second slider towards the first relative position, the second slider compressing the spring as the lever or handle is rotated to the second position, wherein expansion of the spring after release of the lever or handle causes the lever or handle to return to the first position via translation of the first and second sliders from the second relative position to the first relative position. The lever operator may further include a damper for reducing closing speed of the lever or handle as the lever or handle is released from the second position and the first and second sliders translate from the second relative position to the first relative position, and the damper may be a linear damper contacting a bottom end of the second slider.

In at least one embodiment, the first and second sliders are disposed within the casing along parallel axes, such that the first direction is opposite of the second direction. In another embodiment, the first slider is disposed along a first axis and the second slider is disposed along a second axis, such that the second axis forms an angle with respect to the first axis.

In one or more embodiments, the first and second sliders comprise racks and the at least one linkage comprises at least one pinion gear coupling the first rack to the second rack. The handle may be rotatable along a plane perpendicular to an axis of rotation of the at least one pinion gear, or the axis of rotation of the handle may be different than the axis of rotation of the at least one pinion gear.

The first pivot point pivotally connecting the linkage arm to the casing may be fixed to the casing, such that as the lever or handle is rotated from the first position to the second position, the third pivot point pivotally connecting the lever or handle and the first slider translates toward the first pivot point along a longitudinal axis.

The lever or handle may include a fixed linkage arm extending at an angle proximate the lever or handle first end, and the third pivot point may be positioned proximate a free end of the fixed linkage arm.

In at least one embodiment, the casing may include a sidewall section having a longitudinal slot, such that the lever or handle is pivotable within the longitudinal slot between a concealed position and an open position.

In yet another aspect, the present invention is directed to a method of operating a bolt assembly, comprising: providing a first component including a casing; first and second sliders disposed within the casing, the first and second sliders translatable between first and second relative positions; at least one linkage coupling the first slider to the second slider, such that translation of the first slider in a first direction causes the second slider to move in a second direction different than the first direction; a linkage arm pivotally attached at one end to the casing at a first pivot point, and pivotally attached at the other end to a lever or handle at a second pivot point; the lever or handle in pivotal communication with the first slider at a point proximate one end of the lever or handle at a third pivot point, and in pivotal communication with the linkage arm at an intermediate point on the handle at the second pivot point; and one or more pliable connectors attached at one end to the second slider and at an opposing end to a bolt displaceable between extended and retracted positions, the bolt mounted to the first component and interengageable with a second component when the first and second components are in a predetermined position relative to each other and the bolt is extended. The method further comprises: moving the first and second components to the predetermined position; moving the bolt to the extended position to engage the second component; rotating the lever or handle from a first position to a second position to pivot the linkage arm about the first and second pivot points and cause the first and second sliders to translate between the first and second relative positions; and applying a tension force to the one or more pliable connectors by the second slider as the second slider translates to the second relative position to retract the bolt.

In at least one embodiment, the casing may further include a spring normally biasing the second slider towards the first relative position, and the method may further comprise: compressing the spring by the second slider as the lever or handle is rotated to the second position; and causing the lever or handle to return to the first position via translation of the first and second sliders from the second relative position to the first relative position via expansion of the spring after release of the lever or handle.

In one or more embodiments, the first and second sliders may comprise racks and the at least one linkage may comprise at least one pinion gear coupling the first rack to the second rack, and in one embodiment, the method may further comprise: rotating the lever or handle from the first position to the second position along a plane perpendicular to an axis of rotation of the at least one pinion gear. In another embodiment, the method may further comprise: rotating the lever or handle from the first position to the second position along an axis of rotation different than an axis of rotation of the at least one pinion gear.

The first pivot point may be fixed to the casing, and the method may further include: translating the third pivot point toward the first pivot point along a longitudinal axis as the lever or handle is rotated from the first position to the second position. In at least one embodiment, the casing may further include a sidewall section having a longitudinal slot, wherein the lever or handle is pivotable within the longitudinal slot between a concealed position and an open position.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE EMBODIMENT(S)

Figure 1:
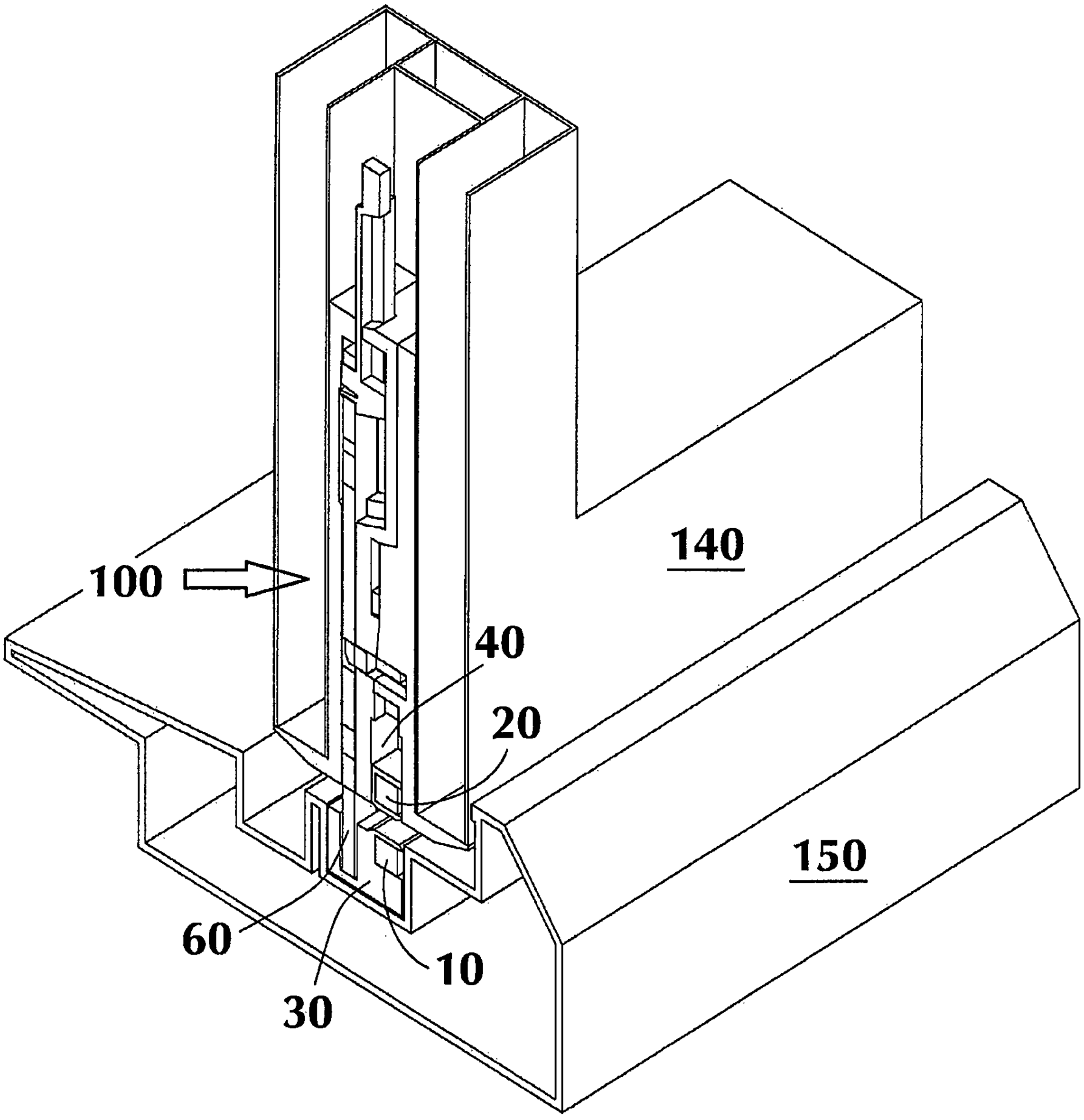
FIG. 1 is a perspective, cross-sectional view of an embodiment of the magnetically-triggered lock mechanism of the present invention mounted within an enclosure to prevent access to the interior of the enclosure.

In describing the embodiments of the present invention, reference will be made herein to FIGS. 1-33 of the drawings, in which like numerals refer to like features of the invention.

Certain terminology is used herein for convenience only and is not to be taken as a limitation of the invention. For example, words such as "upper," "lower," "left," "right," "horizontal," "vertical," "upward," "downward," "clockwise," and "counterclockwise" merely describe the configuration shown in the drawings. Indeed, the referenced components may be oriented in any direction and the terminology, therefore, should be understood as encompassing such variations unless specified otherwise. For purposes of clarity, the same reference numbers will be used in the drawings to identify similar elements.

Additionally, in the subject description, the words "exemplary," "illustrative," or the like are used to mean serving as an example, instance or illustration. Any aspect or design described herein as "exemplary" or "illustrative" is not necessarily intended to be construed as preferred or advantageous over other aspects or design. Rather, use of the words "exemplary" or "illustrative" is merely intended to present concepts in a concrete fashion.

The present invention is directed in a first aspect to a magnetically-triggered bolt assembly for engaging a window or door with a strike or frame to prevent access to the interior of an enclosure and a concealed handle or lever mechanism or actuator for driving the magnetically-triggered bolt assembly.

One embodiment of the magnetically-triggered bolt assembly or lock mechanism of the present invention is shown in FIGS. 1-7, inclusive. The lock mechanism includes a magnetically-triggered bolt mounted, for example, within a door panel movable between an open position and a closed position, and a strike positioned in the base of a door frame for receiving the triggered bolt when the door is in the locked position. It should be understood by those skilled in the art that the lock mechanism of the present invention is not limited to enclosures secured by a door, and may also be used to interengage other relatively movable components, such as a window frame and sill. Magnets secured in the strike and trigger mechanism for the bolt, respectively, are oriented and positioned such that they repel one another when in alignment, overcoming the forces of friction and trigger spring normally biasing the trigger in a downward direction, and pulling a locking shuttle away from the bolt, thereby allowing a compressed bolt spring to release and fire the bolt downward into the pocket of the strike.

Referring now to FIG. 1, one embodiment of a magnetically-triggered lock mechanism 100 of the present invention is shown mounted in a door panel 140, to secure the door panel to a door frame 150 to prevent access to the interior of an enclosure when bolt 60 is extended into an opening in a strike 30 in the bottom of the door frame. It should be understood by those skilled in the art that in other embodiments, door panel 140 may instead be a window frame and door frame 150 may be a window sill, or other such similar enclosure for which preventing access is required. When door panel 140 is in a locked state, bolt 60 is biased downward by a bolt spring exerting vertical force on a bolt spring carrier and an internal housing, thereby securing bolt 60 in the pocket of the strike 30, preventing opening of the door panel 140. Magnets 10, 20 are oriented and secured in the strike 30 and bolt trigger mechanism 40, respectively, such that the magnets repel each other when in vertical alignment, as shown. As magnets 10, 20 align as the door panel 140 moves into a closed position, the repelling force becomes great enough to overcome the forces of friction as well as a trigger spring normally biasing the trigger 40 downward (as shown in FIG. 1). The magnetic repulsion force thus moves trigger 40 upward into the firing mechanism (comprising the trigger housing, a locking shuttle, bolt and bolt carrier, and associated springs), pulling the locking shuttle away from the bolt 60 and allowing bolt 60 to be fired into the pocket of the strike 40 by the release of the compressed bolt spring. The door panel is held closed by the interaction of bolt 60 and strike 30.

Figure 2:
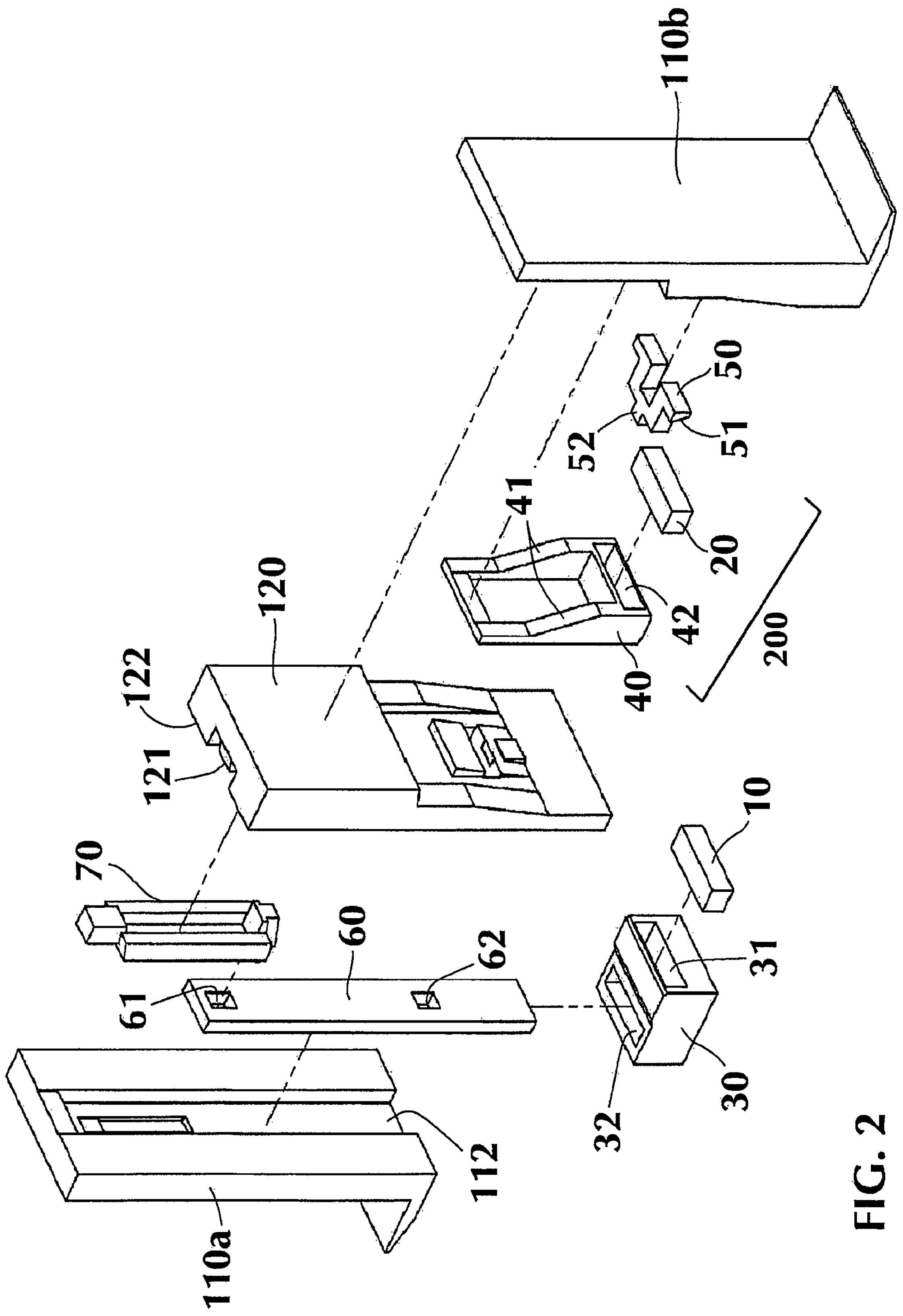
FIG. 2 is an exploded view of the magnetically-triggered lock mechanism shown in FIG. 1.

FIG. 2 shows an exploded view of the magnetically-triggered lock mechanism 100, as seen in FIG. 1. The door panel and frame have been removed for clarity. As can be seen in FIG. 2, lock mechanism 100 comprises a magnetically-triggered bolt assembly held within an outer housing having sides 110*a*, 110*b*. A permanent magnet 10 is mounted within opening 31 in strike 30, whereby strike 30 may be positioned, for example, in the bottom of a door or window frame as shown in FIG. 1. Strike 30 further includes an opening or pocket 32 for receiving the triggered bolt 60, which translates vertically within a channel 112 on the inner surface of outer housing 110*a*. A corresponding permanent magnet 20 is oriented and mounted within trigger housing 40 such that the adjacent surfaces of magnets 10, 20 have the same polarity and repel each other when in vertical alignment. Trigger housing 40 further comprises at least one angled surface 41 for mating with a correspondingly angled surface 51 on a face of locking shuttle 50. Trigger housing 40, magnet 20, and locking shuttle 50 collectively comprise a magnetically-releasable latch mechanism 200, which latches bolt 60 in a retracted position. Latch mechanism 200 is mounted for movement between a biased latch engaging position and a latch releasing position in a non-common direction of movement of the bolt 60. In the embodiment shown, the latch mechanism translates between latched and unlatched positions in a direction perpendicular to the movement of bolt 60.

Figure 3:
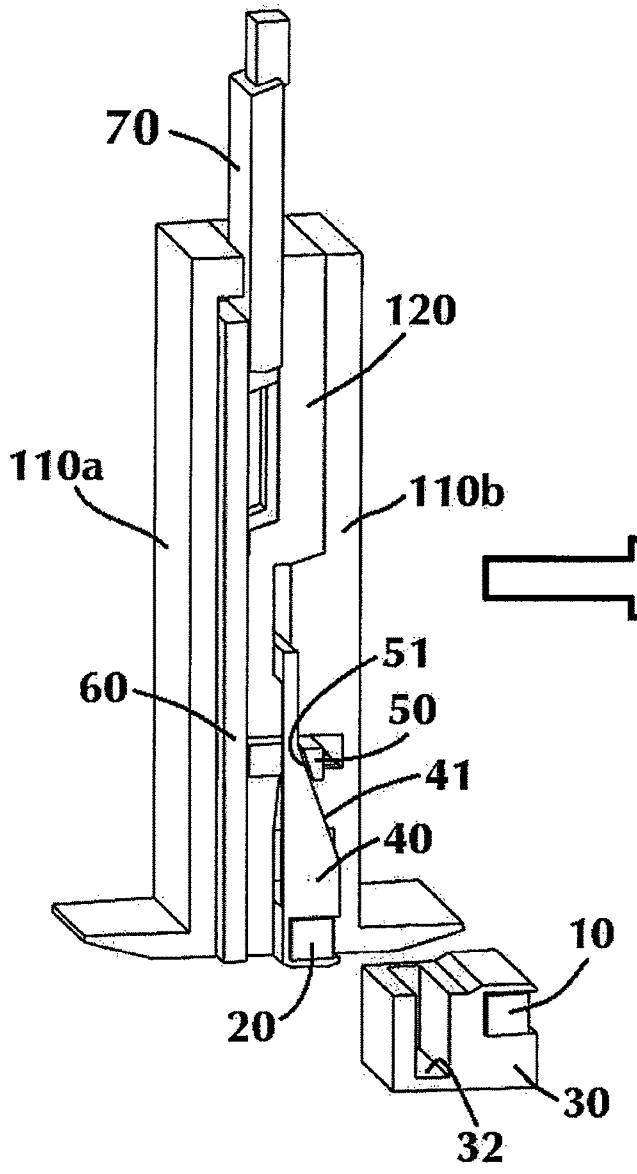
FIG. 3 is a front, cross-sectional view of the magnetically-triggered lock mechanism of the present invention in a fully unlocked state.
Figure 4:
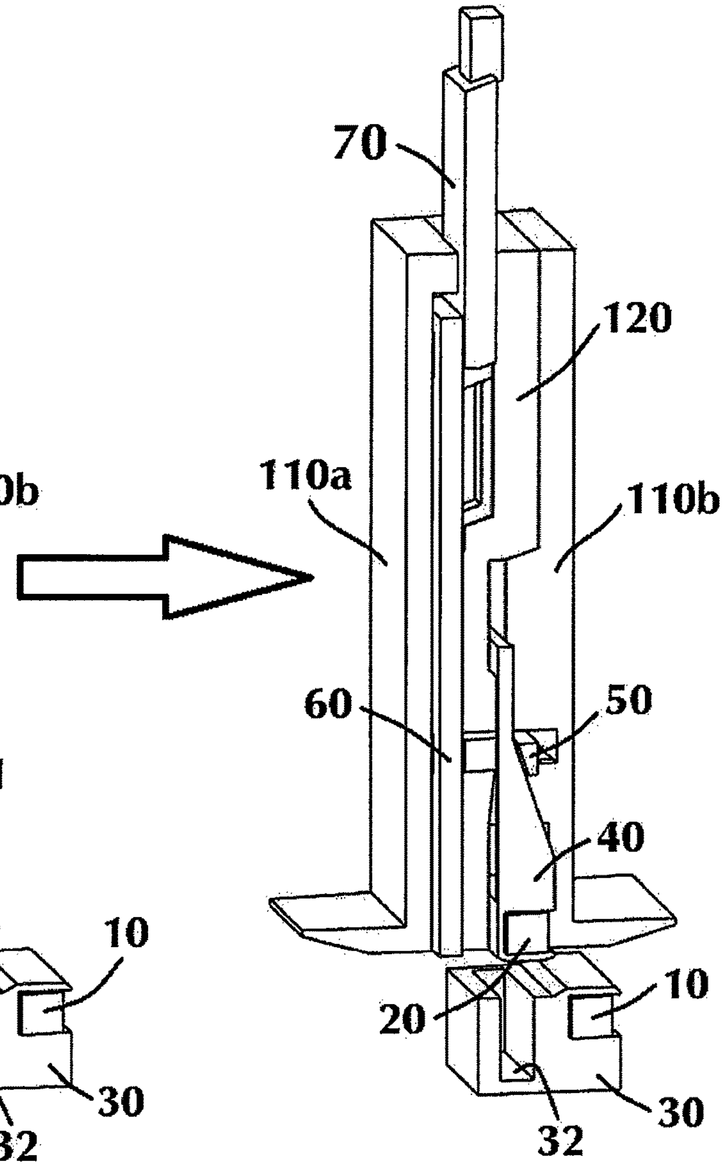
FIG. 4 is a front, cross-sectional view of the lock mechanism shown in FIG. 3 approaching the strike.
Figure 7:
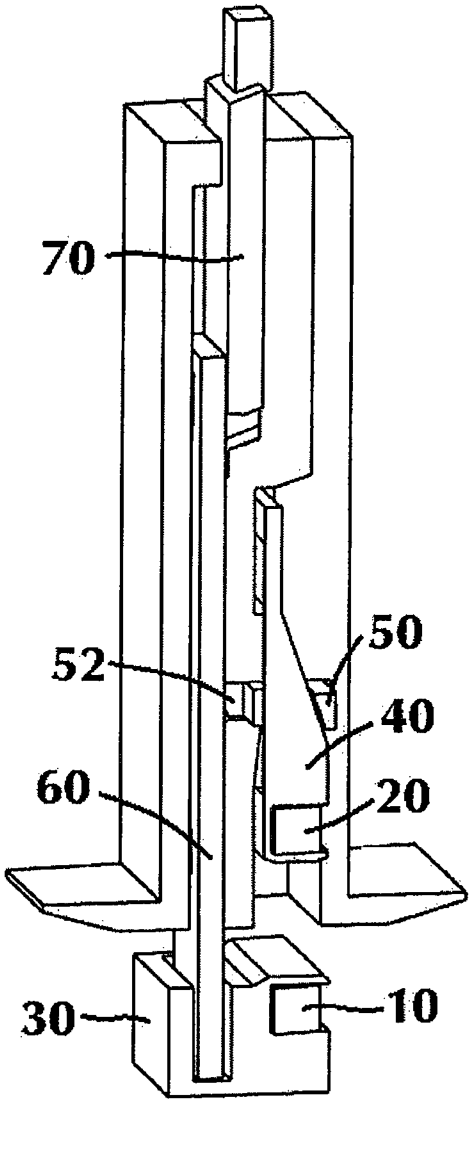
FIG. 7 is a front, cross-sectional view of the lock mechanism shown in FIGS. 3-6 in a fully locked state.
Figure 8:
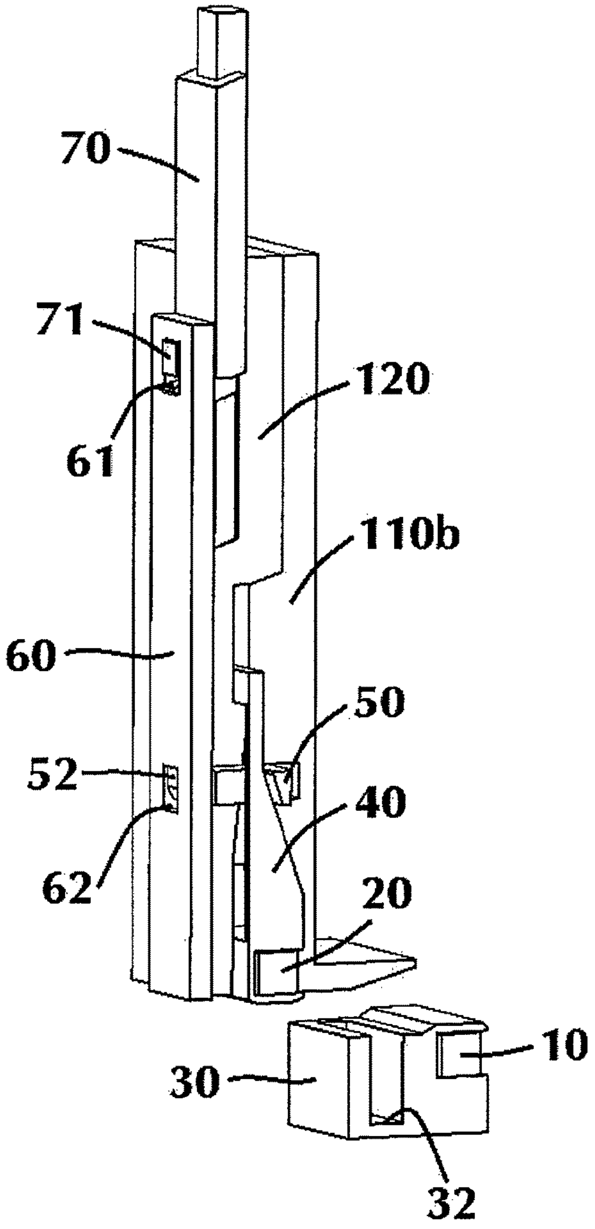
FIG. 8 is a perspective, cross-sectional view of the lock mechanism of the present invention in a fully unlocked state, with a portion of the outer housing removed to show the bolt in a retracted position and the magnetically-releasable latch mechanism in the biased latch engaging position.
Figure 9:
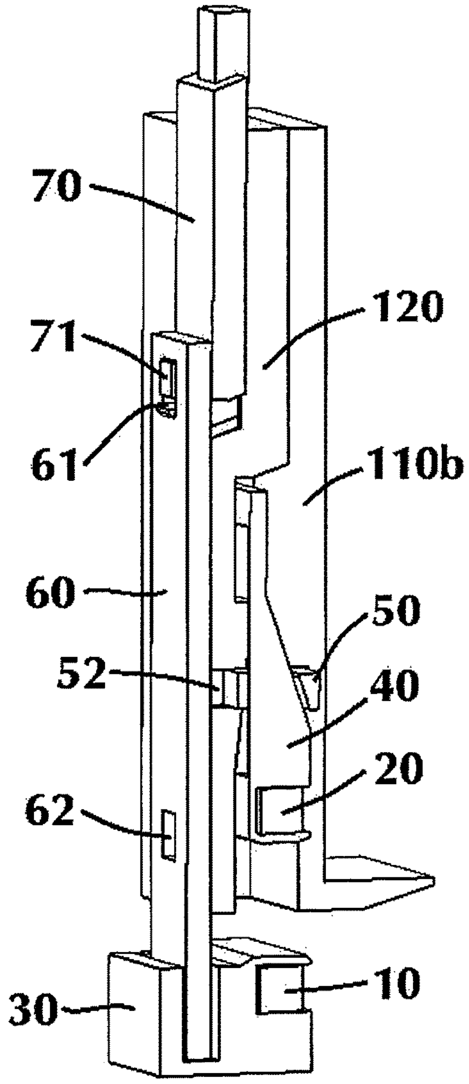
FIG. 9 is a perspective, cross-sectional view of the lock mechanism of the present invention in a locked state, with a portion of the outer housing removed to show the bolt in an extended position and the magnetically-releasable latch mechanism in the latch releasing position.

As further shown in FIG. 2, a bolt spring carrier 70 engages the top portion of bolt 60 at aperture 61 via projection 71 (as shown in FIGS. 8-9) and translates vertically within a channel 121 on surface 122 of inner casing or inner housing 120. Bolt 60 is normally biased downward toward an extended position by a bolt spring within carrier 70; however when the door or window is open, bolt 60 is maintained in a retracted position by locking shuttle 50. When the latching mechanism 200 is in the latched position, projection 52 on locking shuttle 50 extends within aperture 62 of bolt 60 to lock the bolt in position relative to the firing mechanism and prevent vertical movement of the bolt 60 (FIGS. 3, 8). When the latch is released, i.e., when locking shuttle projection 52 is retracted from bolt aperture 62 by translation of the locking shuttle, the bolt is permitted to fire downward into an opening 32 in the strike (FIGS. 7, 9).

FIGS. 3-7 show the lock mechanism transitioning from an unlocked state to a locked state, thereby interengaging the two relatively moveable components, such as a door or window panel and associated frame, as shown in FIG. 1.

FIG. 3 shows the locking mechanism 100 in a fully unlocked state. Force has been applied upwards to the bolt spring carrier 70, compressing the bolt spring and pulling bolt 60 out of the pocket or opening 32 of the strike 30, allowing the door panel to move to an open position. Generally, as the firing mechanism (comprising the trigger 40, locking shuttle 50, bolt 60 and bolt carrier 70, and associated springs) moves away from the strike assembly 30, the repelling force between magnets 10 and 20 decreases, allowing the trigger spring to decompress, and force the trigger housing 40 towards the outside of the firing mechanism. As the trigger 40 moves to the outside of the firing mechanism, shuttle 50 is biased towards bolt 60 by a shuttle spring, locking the bolt 60 in a latched position relative to the firing mechanism and preventing vertical movement of the bolt 60 as the door is opened.

FIG. 8 shows locking mechanism 100 in a fully unlocked state, with a portion of the outer housing 110*a* removed. As shown in FIG. 8, bolt 60 in a retracted position and the locking shuttle 50 is in a biased latch engaging position. More specifically, a shuttle spring is normally biasing shuttle 50 in the direction of bolt 60, such that locking shuttle projection 52 is extended within bolt aperture 62 to maintain the bolt 60 in a retracted position. As shown in FIG. 8, when the locking shuttle is in the biased latch engaging position, the locking shuttle is approximately at a top portion of the angled mating surface of the trigger 40.

Figure 5:
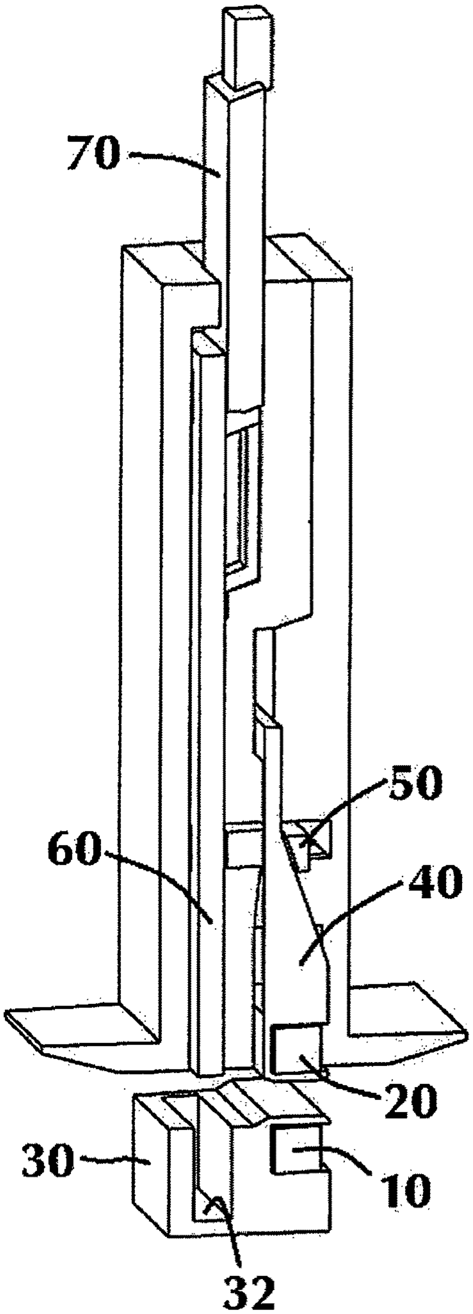
FIG. 5 is a front, cross-sectional view of the lock mechanism shown in FIGS. 3-4 aligned with the strike.
Figure 6:
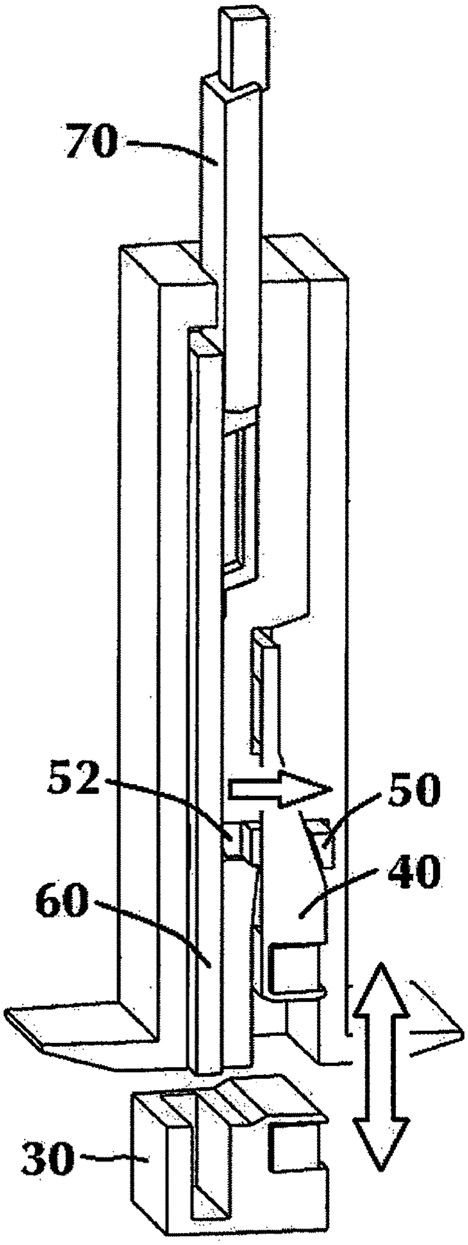
FIG. 6 is a front, cross-sectional view of the lock mechanism shown in FIGS. 3-5 with the locking shuttle disengaged from the bolt and just prior to triggering the bolt to extend into the strike.

Referring now to FIGS. 5-7, as the firing mechanism approaches the strike assembly 30 during movement of the door panel to a closed position, magnets 10 and 20 begin to repel one another and the repelling force between the magnets becomes great enough to overcome the forces of friction and the trigger spring. The magnetic repulsion between magnets 10, 20 urges trigger housing 40 upwards, into the firing mechanism. The angled mating surfaces 41, 51 of the trigger housing 40 and shuttle 50, respectively, convert the vertical motion of the trigger 40 (which houses magnet 20) into horizontal motion of the shuttle 50. As shown in the transition between FIG. 5 to FIG. 6, the magnetic repulsion between magnets 10, 20 compresses the trigger spring and moves the trigger housing 40 and magnet 20 into the firing mechanism, pulling the shuttle 50 away from the bolt 60 and compressing the shuttle spring, which normally biases the shuttle towards the bolt 60. Shuttle projection 52 is thus retracted from bolt aperture 62 by translation of shuttle 50, as shown in FIG. 6. As the bolt 60 is now free to move vertically, the compressed bolt spring is released, pushing the bolt spring carrier 70 and bolt 60 outward and firing the bolt into the pocket 32 of the strike 30, thereby preventing movement of the door panel, as shown in FIG. 7. It should be understood by those skilled in the art that, in operation, the locking steps as shown in FIGS. 5 to 7 are happening near-simultaneously; however, the steps are being shown as discrete actions to more clearly depict the motion.

FIG. 9 shows locking mechanism 100 in a fully locked state, with a portion of the outer housing 110*a* removed. As shown in FIG. 9, bolt 60 in an extended position and the locking shuttle 50 is in the latch releasing position. The magnetic repulsion between magnets 10, 20 has urged trigger housing 40 upwards (as compared to FIG. 8, for example), into the firing mechanism, and the angled mating surfaces of the trigger housing 40 and shuttle 50, respectively, have converted the vertical motion of the trigger 40 into horizontal motion of the shuttle 50, moving the shuttle into the latch releasing position and retracted locking shuttle projection 52 from bolt aperture 62, such that the bolt has been permitted to fire downward into opening 32 in strike 30. As shown in FIG. 9, when the locking shuttle 50 is in the latch releasing position, the locking shuttle is located near a bottom portion of the angled mating surface of the trigger 40.

To return to an unlocked state, force may be applied upwards to the bolt spring carrier 70, such as by rotating a door handle, compressing the bolt spring in bolt spring carrier 70 and pulling bolt 60 out of the pocket of the strike 30. As the door panel (including the firing mechanism) moves away from the strike assembly 30 during opening of the door, the repelling force between magnets 10 and 20 decreases, allowing the trigger spring to decompress and biasing the trigger housing 40 towards the outside of the firing mechanism. As the trigger 40 moves to the outside of the firing mechanism, shuttle 50 is biased towards bolt 60 by the shuttle spring, latching the bolt in a retracted position relative to the firing mechanism by the re-engagement of locking shuttle projection 52 with bolt aperture 62, as described above.

It should be understood by those skilled in the art that the configuration of the lock mechanism of the present invention as shown in FIGS. 1-9, inclusive, and in particular the configuration of the bolt, locking shuttle and trigger, is shown as configured for exemplary purposes only, and that other configurations are within the intended scope of the present invention, so long as the magnetic repulsion between the magnets located in the first and second components, respectively, causes the magnetically-releasable latch mechanism to move from a biased latch engaging position to a latch releasing position via the interaction between the locking shuttle and the trigger to allow the bolt to fire to interengage the first and second components.

In another embodiment, as shown in FIGS. 10-26, the lock mechanism or shoot bolt assembly may further include a back drive prevention subassembly that allows for the bolt to freely extend out of the housing in the extended position but prevents the bolt from being retracted without releasing the subassembly. The back drive prevention subassembly may include a linear actuator in the form of a rack and pinion, wherein the subassembly may be installed in a recess 124 in housing 120'. In conventional use, the teeth of a circular gear known as the pinion engage teeth on a linear gear bar known as the rack, such that rotational motion applied to the pinion causes the rack to move relative to the pinion, thereby translating the rotational motion of the pinion into linear motion. However, in the present invention, the rack and pinion are used to prevent linear motion between the component on which the pinion is mounted and the component on which the rack is mounted. In the embodiment shown, rack 132 is disposed vertically along length of an inner surface of inner housing 120' secured within the door panel. Bolt carrier 70' is slideable up and down within inner housing 120' and secures bolt 60' at a lower end by a set screw. As best seen in FIG. 24, bolt spring 170 is disposed within channel 172 in bolt carrier 70'. The upper end of bolt spring 170 is connected to a flange 171 extending from inner housing 120' (FIG. 10), while the lower end of the bolt spring bears against the lower end of channel 172. Bolt spring 170 biases bolt carrier 70' and bolt 60' downward toward the extended position, but may be compressed by movement of bolt carrier 70' and bolt 60' upward into the retracted position.

Figure 10:
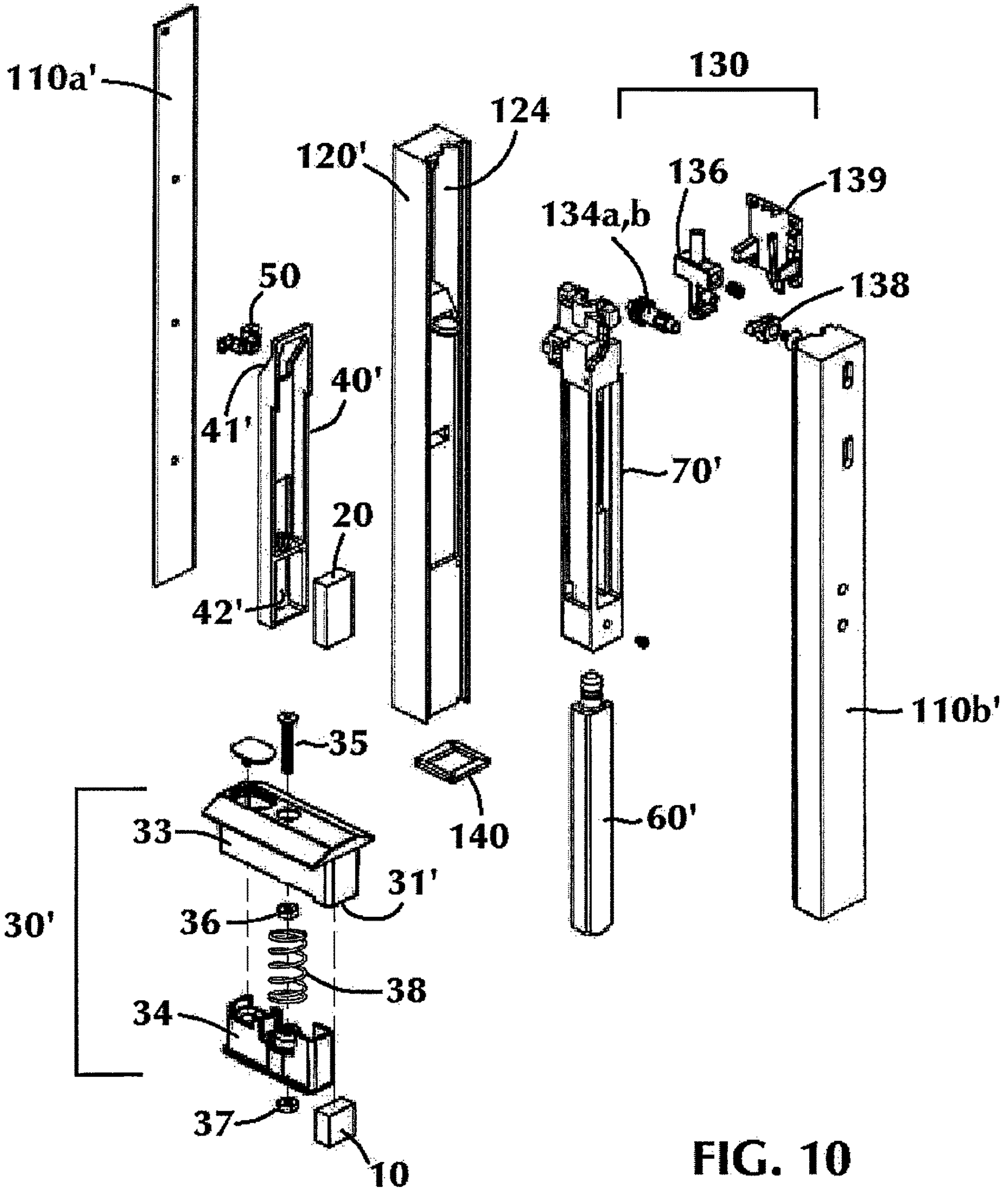
FIG. 10 is an exploded view of another embodiment of the magnetically-triggered lock mechanism of the present invention.
Figure 11:
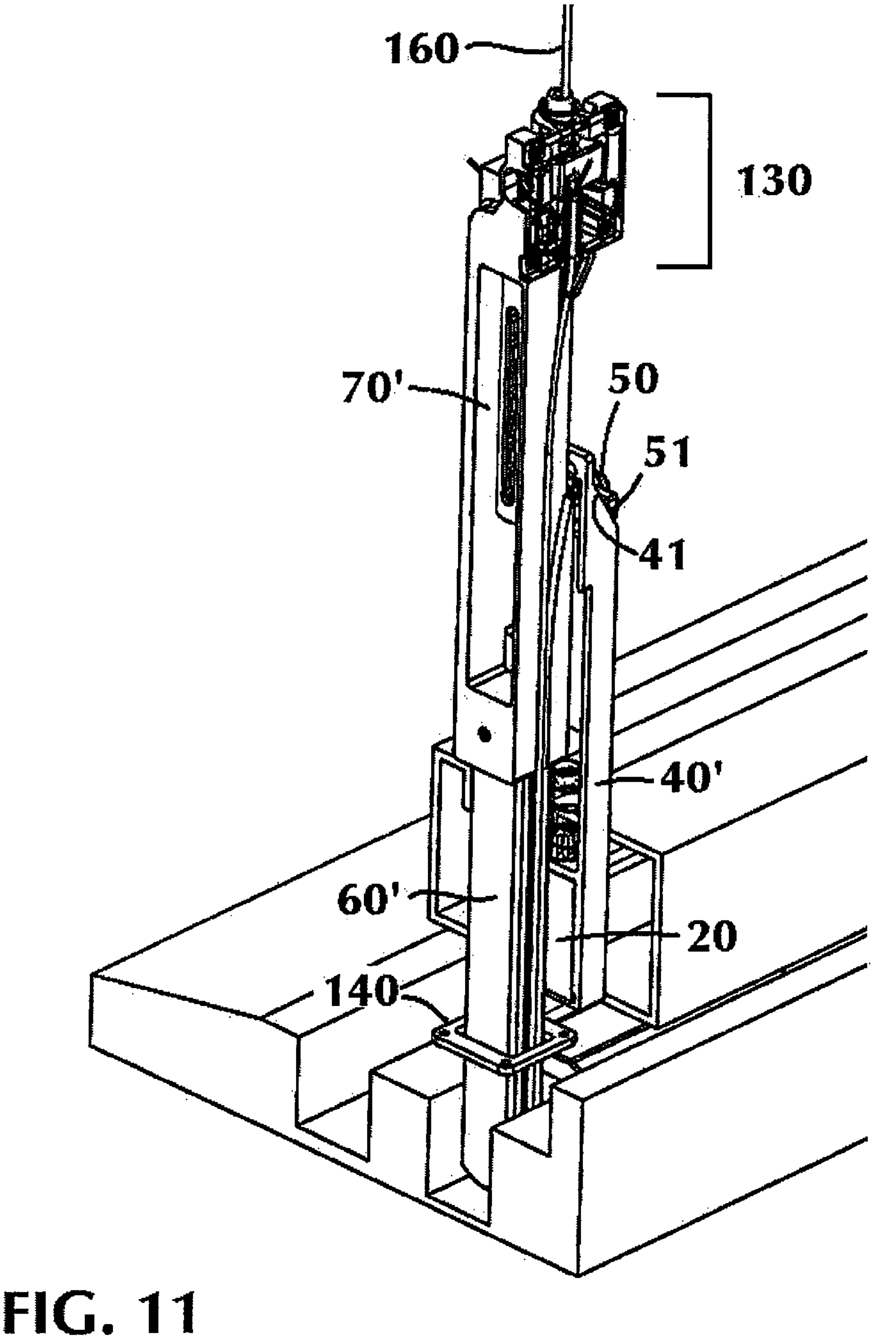
FIG. 11 is a perspective, cross-sectional view of the embodiment of the magnetically-triggered lock mechanism shown in FIG. 10 mounted within an enclosure, with the bolt in an extended position to prevent access to the interior of the enclosure. The outer housing is not shown to more particularly depict the interior hardware of the lock mechanism.
Figure 12:
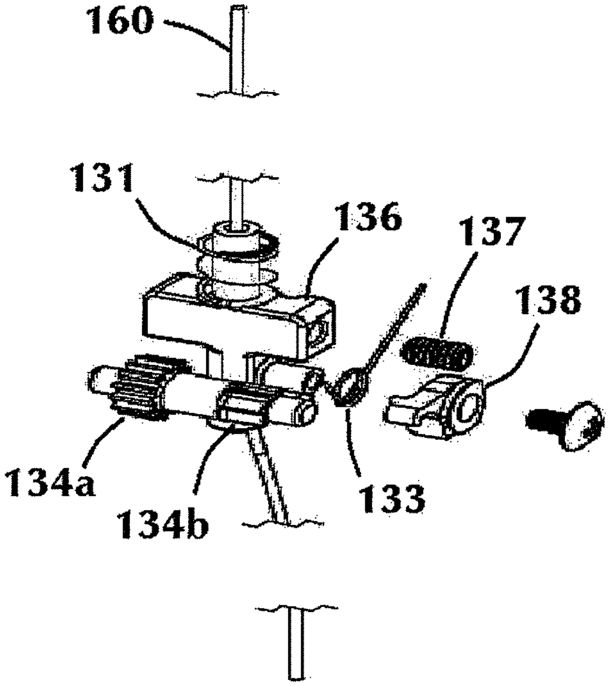
FIG. 12 is an isolated, exploded view of the back drive prevention subassembly of the embodiment of the present invention shown in FIGS. 10-11.
Figure 13:
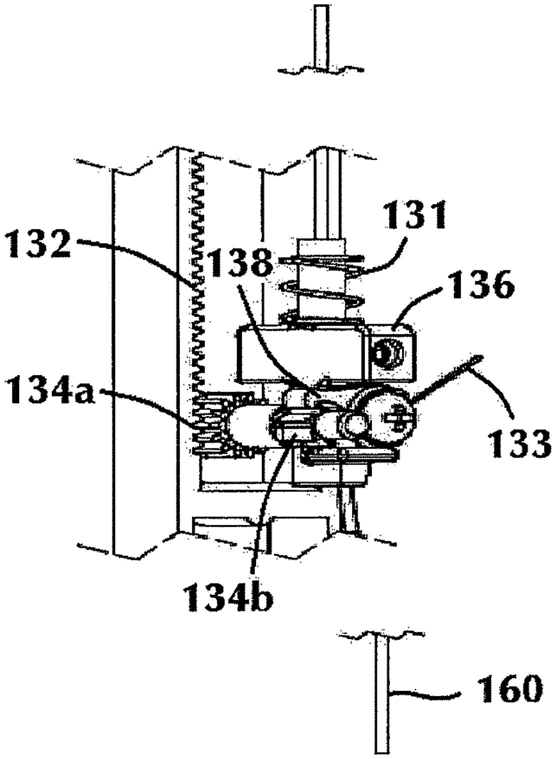
FIG. 13 is an isolated, perspective view of the back drive prevention subassembly of FIG. 12, depicting a pinion gear engaged with the rack.

FIGS. 12-15 and 25-26 depict one embodiment of a back drive prevention subassembly 130. As seen in FIG. 10, and more particularly shown in FIGS. 12-13, subassembly 130 comprises a backing plate 139, rack 132, a pair of gears 134*a* and 134*b*, a pawl 138, and a slack block 136 housed within bolt spring carrier 70' (FIG. 11). As best seen in FIG. 13, pinion gear 134*a* engages rack 132 and gear 134*b* is engageable with pawl 138. The teeth of pinion gear 134*a* engage with the teeth of rack 132. Pinion gear 134*a* is mounted on a shaft along with gear 134*b*, and spaced therefrom. The shaft is mounted on the upper end of bolt spring carrier 70', and bolt 60' is secured by a set screw to the lower end of bolt spring carrier 70' and extends downward. Pawl 138 is normally biased by torsion spring 133 to engage gear 134*b* (FIG. 12). Gears 134*a,b* are synchronized such that rotation of one gear causes the other gear to rotate in the same direction.

Figure 14:
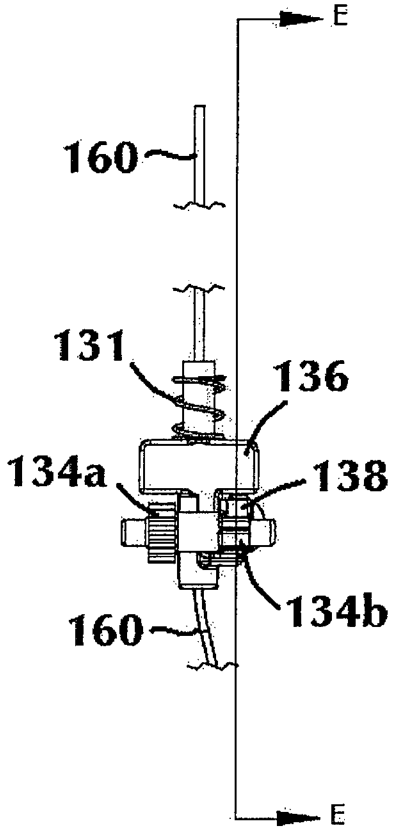
FIGS. 14 and 14A are side plan, and cross-sectional views, respectively, of the back drive prevention subassembly of FIG. 13, depicting the pawl engaged with a second gear and permitting rotation of the gear only in a counterclockwise direction.
Figure 14A:
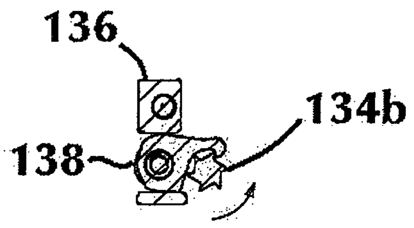
Figure 15A:
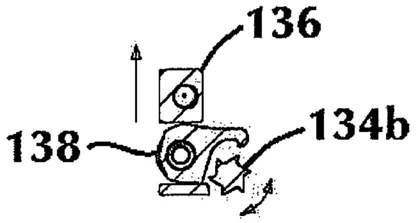
FIGS. 15 and 15A are side plan, and cross-sectional views, respectively, of the back drive prevention subassembly of FIG. 13, depicting the pawl disengaged with the second gear and permitting free rotation of the gear in either direction.
Figure 15:
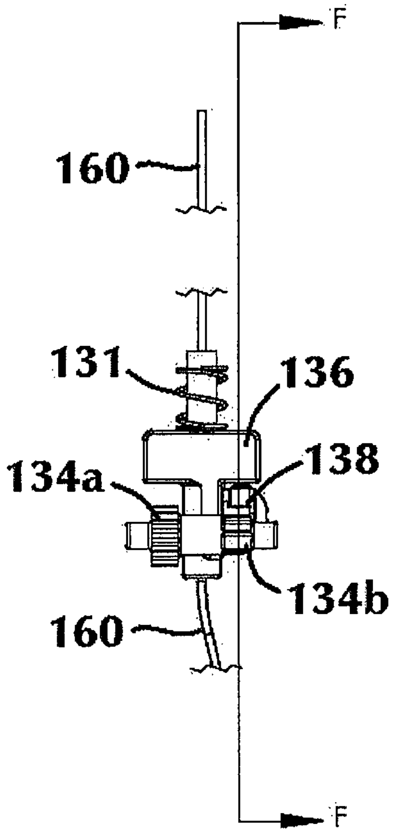
Figure 16:
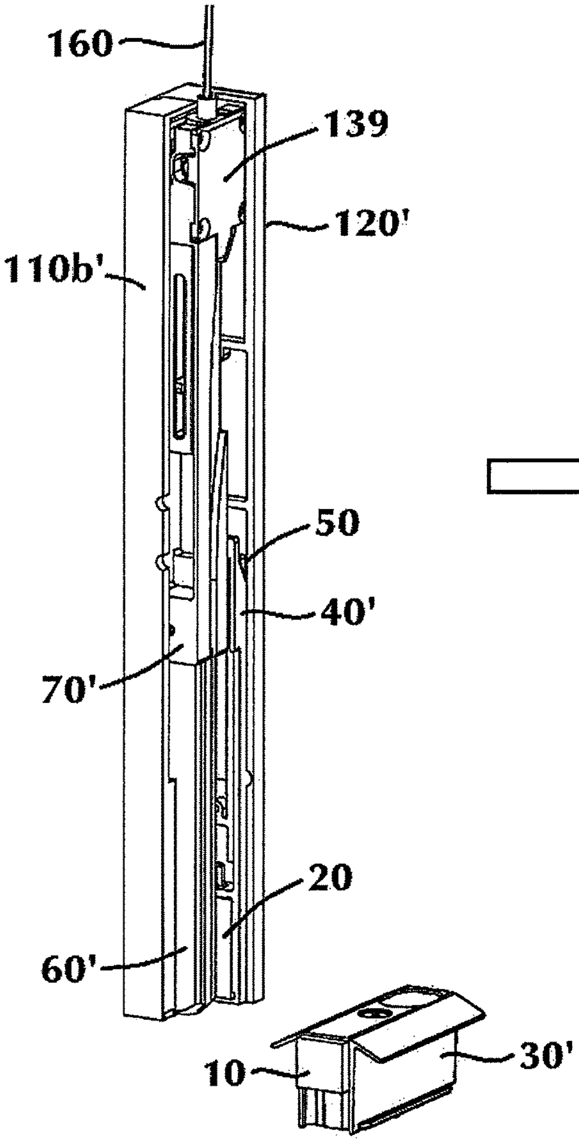
FIG. 16 is a perspective, cross-sectional view of the magnetically-triggered lock mechanism shown in FIGS. 10-11, in a fully unlocked state.
Figure 17:
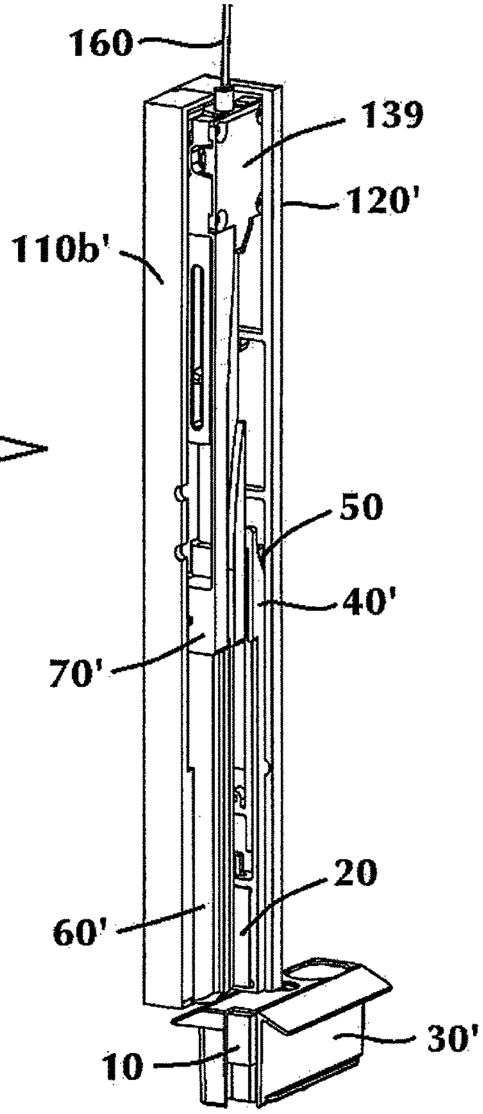
FIG. 17 is a perspective, cross-sectional view of the lock mechanism shown in FIG. 16 approaching the strike.
Figure 25:
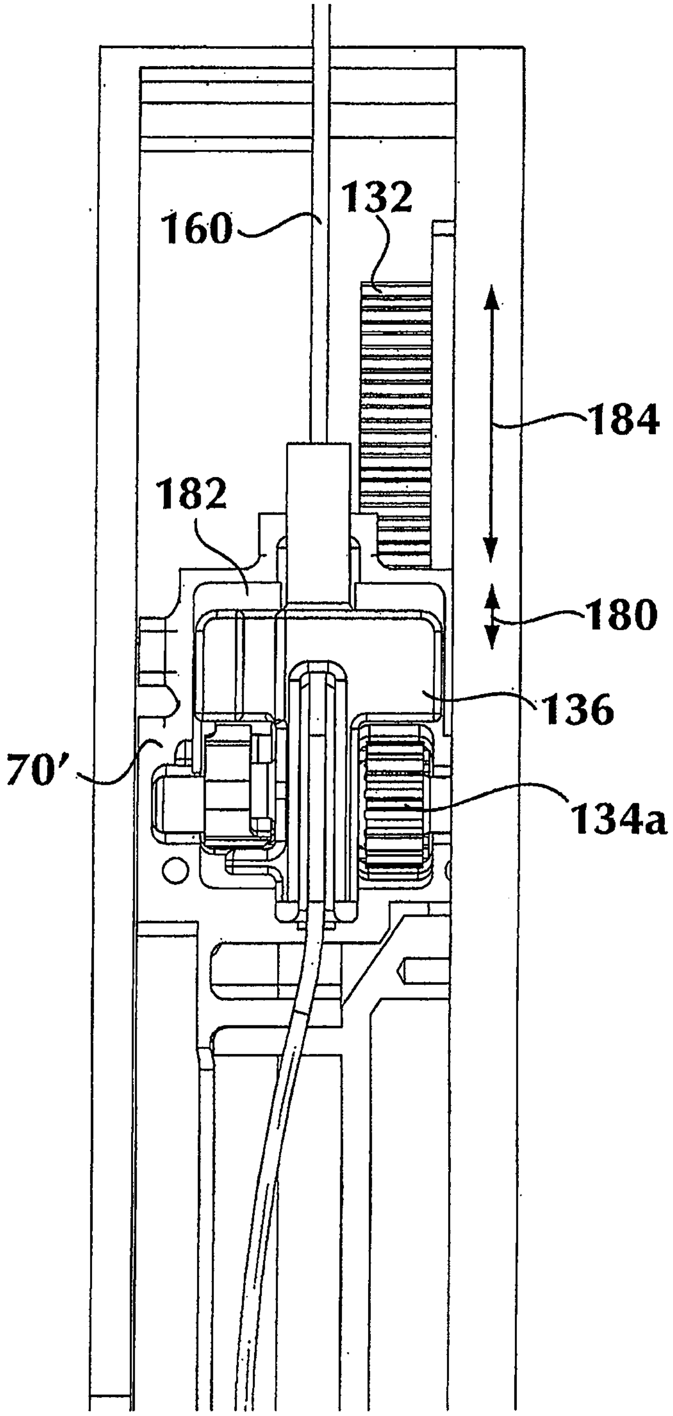
FIG. 25 is a front, cross-sectional view of the lock mechanism of FIG. 20 taken along line G-G, showing the slack block and pawl in a normally biased, engaged position.
Figure 26:
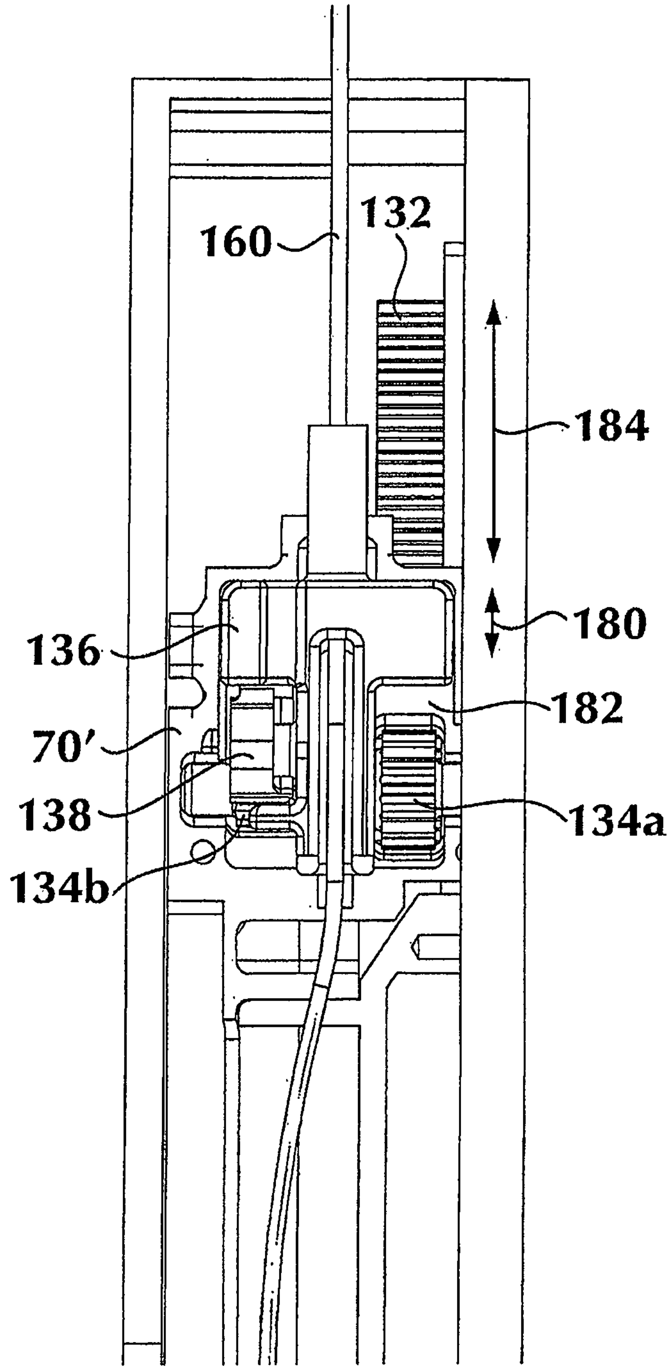
FIG. 26 is a front, cross-sectional view of the lock mechanism of FIG. 25, showing the slack block and pawl in a disengaged position.
Figure 27:
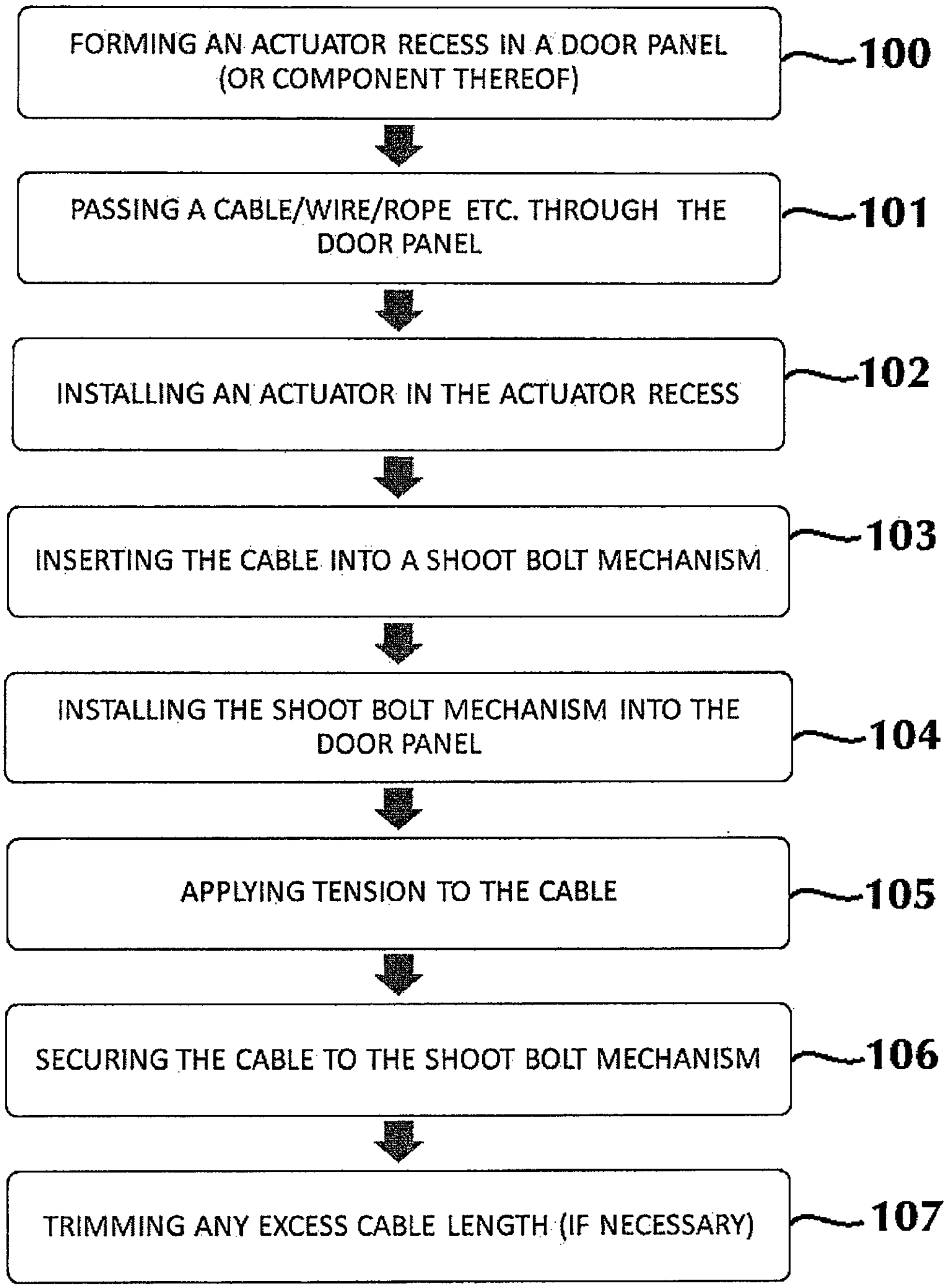
FIG. 27 is a flowchart depicting a method of assembly of the lock mechanism or bolt assembly of the present invention.

Slack block 136 is permitted to translate up and down within bolt spring carrier 70' from a first, upward position to a second, downward position in a rack and pinion manner by converting rotational motion of gear 134*a* into linear motion along rack 132, and is normally biased in a downward direction by compression spring 131. Slack block 136 limits and controls the range of movement of pawl 138. FIGS. 14 and 15, and more clearly FIGS. 25 and 26, show the limits of movement of slack block 136. Slack block 136 is free to move within a slot 182 within bolt carrier 70' and biased by spring 131 into the engaged position, as shown in FIG. 27. When slack block 136 is in the down position, pawl 138 engages gear 134*b* and allows for rotation of gears 134*a,b* in only one direction (counterclockwise as shown in FIG. 14A). More specifically, when pawl 138 is engaged, gears 134*a,b* are prevented from rotating in a direction allowing for retraction of the bolt (clockwise, as shown in FIG. 14A). The pinion gear teeth are non-symmetric to permit the finger at the distal end of pawl 138, which is biased by torsion spring 133 toward the pinion gear 134*b*, to permit the pawl to move against the bias and slide along the surface on one side of the tooth and permit rotation of the pinion gear in one direction, i.e., the direction in which it would move if the bolt spring carrier 70' and bolt 60' were moved downwards into the extended locked position and into engagement with the door frame strike. However, if an attempt were made to move the bolt spring carrier 70' and bolt 60' upwards out of engagement with the strike, the pawl 138 finger would engage the pinion gear tooth surface and prevent rotation of the pinion gear in the opposite direction, thereby preventing linear motion of the pinion gear 134*a* with respect to rack 132, and movement of the bolt spring carrier 70' and bolt 60' on which the pinion gear is disposed. It should be understood by those skilled in the art that in another embodiment, pinion gear 134*a* may instead be a pawl which is normally biased towards and engages/disengages the teeth of rack 132, similar to the bindings of a snowboard, for example.

Slack block 136 is attached to a flexible connector or cable 160 which extends through a concealed channel in the door or window panel and is secured to the shoot bolt mechanism and to slack block 136. As best seen in FIG. 12, cable 160 may be locked to slack block 136 by a set screw or grub screw 137; however, it should be understood by those skilled in the art that other fastening methods may also be employed to secure the cable to the slack block after the cable has been fed through the mechanism. As further shown in FIG. 15A, when cable 160 is tensioned and pulled upward, slack block 136 moves to disengage pawl 138 from gear 134*b*, allowing for free rotation of gears 134*a,b* in either direction. Cable 160 is also connected to bolt 60', so when cable 160 is pulled upward, it also retracts bolt spring carrier 70' and bolt 60' upwards along rack 132 in the direction of arrow 184 and out of engagement with the strike (FIG. 25). It should be understood by those skilled in the art that in an embodiment where the pinion gear is replaced with a pawl normally biased towards rack 132, the movement of slack block 136 acts to disengage the pawl from the rack prior to movement of the bolt. As shown in FIGS. 25-26, sash block 136 moves independently within slot 182 in the direction of arrow 180 before contacting bolt carrier 70', at which point both move upwards together. In an embodiment, slack block 136 may move upward approximately 2 mm as established by the length of slot 182 to disengage pawl 138 from gear 134*b*, before contacting the end of the slot in bolt carrier 70' (FIG. 26). Back drive subassembly 130 acts as a tamper prevention feature, in that bolt 60 or 60' is prevented from being manually forced into a retracted position by a user able to directly access the bolt without actuation of the handle or lever, as will be described below, thereby permitting the door or window panel to be moved into an unlocked and/or open position relative to the door frame or window sill.

As further shown in FIGS. 10-11, the shoot bolt assembly may further include a collar or support ring 140 attached to inner housing 120 for absorbing and distributing load from bolt 60'. Collar 140 is preferably made of a material having a higher tensile strength and/or compressive strength than that of the housing, such as steel, for example. Collar 140 is disposed around bolt 60 or 60' and is spaced from the bolt to allow for sliding movement of the bolt through the support collar. As bolt 60' moves from the retracted to the extended position, bolt 60' extends through collar 140 and the load is distributed to the casing, as best seen in FIG. 11. In an embodiment, collar 140 may be fully captured between inner casing 120 and outer casing halves 110*a,b* and attached by known means, such as using screws, rivets or other fasteners. The load distribution afforded by collar 140 allows for use of a material having weaker strength for the casing for the lock mechanism, which reduces cost of materials.

Figure 18:
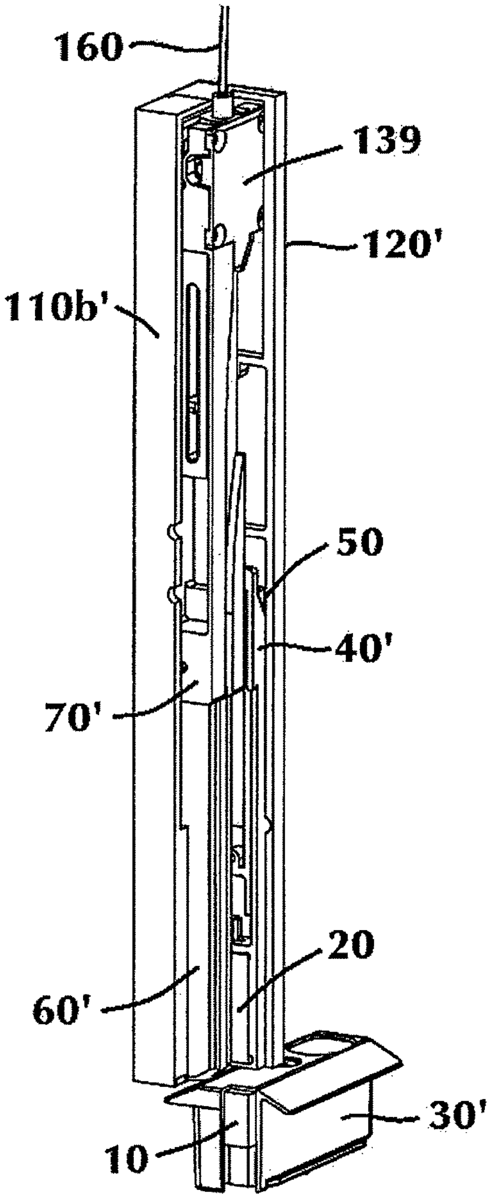
FIG. 18 is a perspective, cross-sectional view of the lock mechanism shown in FIGS. 16-17 aligned with the strike.
Figure 19:
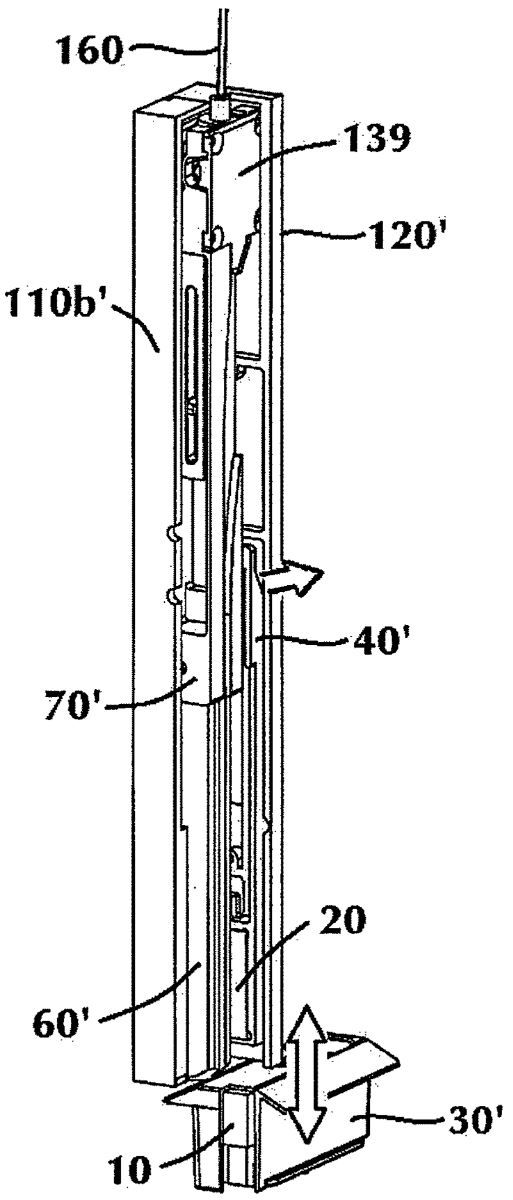
FIG. 19 is a perspective, cross-sectional view of the lock mechanism shown in FIGS. 16-18 with the locking shuttle disengaged from the bolt and just prior to triggering the bolt to extend into the strike.
Figure 20:
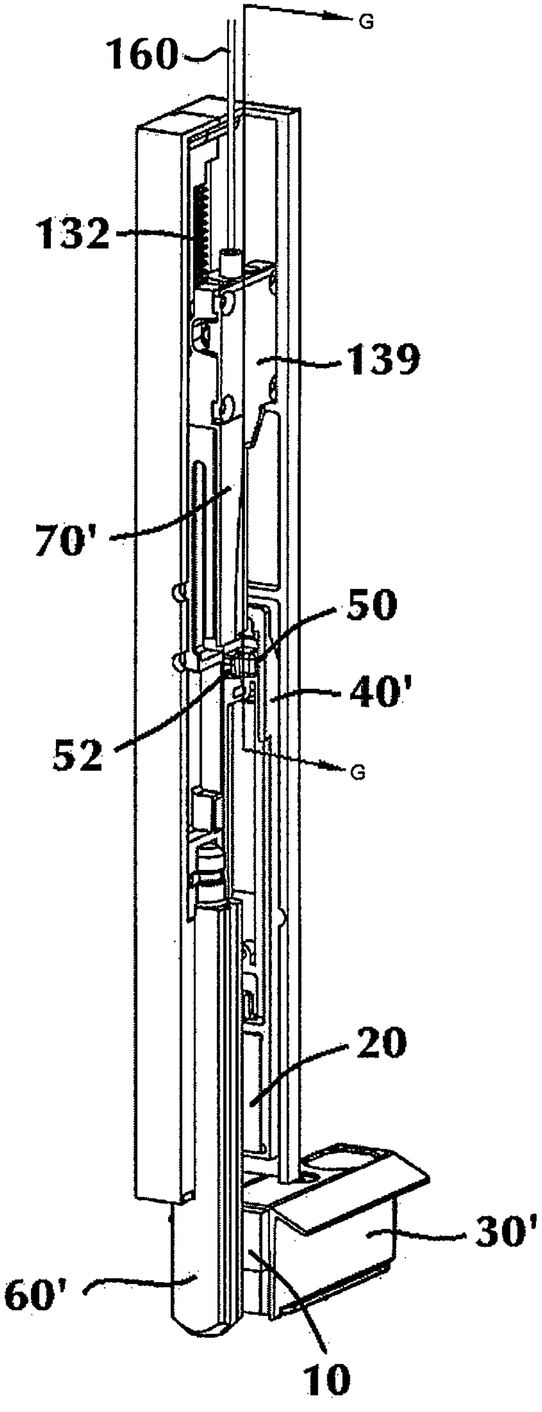
FIG. 20 is a perspective, cross-sectional view of the lock mechanism shown in FIGS. 16-19 in a fully locked state.

FIGS. 16-20 show the lock mechanism or shoot bolt assembly of FIGS. 10-11 transitioning from an unlocked state to a locked state. The actuation of shoot bolt assembly 100' is similar to that of assembly 100, as shown in FIGS. 3-7. Referring specifically to FIGS. 18-20, as the firing mechanism approaches the strike assembly 30' during movement of the door panel to a closed position, magnets 10 and 20 begin to repel one another and the repelling force between the magnets becomes great enough to overcome the forces of friction and the trigger spring 170. The magnetic repulsion between magnets 10, 20 urges trigger housing 40' upwards, into the firing mechanism. The angled mating surfaces 41, 51 of the trigger housing 40' and shuttle 50, respectively, convert the vertical motion of the trigger 40' into horizontal motion of the shuttle 50. As shown in the transition between FIGS. 18-19, the magnetic repulsion between magnets 10, 20 compresses the trigger spring 170 and moves the trigger housing 40' and magnet 20 into the firing mechanism, pulling the shuttle 50 away from the bolt 60' and compressing the shuttle spring, which normally biases the shuttle towards the bolt 60'. Shuttle projection 52 (not shown) is thus retracted from aperture 62' (not shown) in bolt carrier 70' by translation of shuttle 50, as shown in FIG. 19. As the bolt 60' is now free to move vertically, the compressed bolt spring is released, pushing the bolt spring carrier 70' and bolt 60' outward and firing the bolt into the strike 30', thereby preventing movement of the door panel, as shown in FIG. 20. It should be understood by those skilled in the art that, in operation, the locking steps as shown in FIGS. 18-20 are happening near-simultaneously; however, the steps are being shown as discrete actions to more clearly depict the motion.

Figure 21:
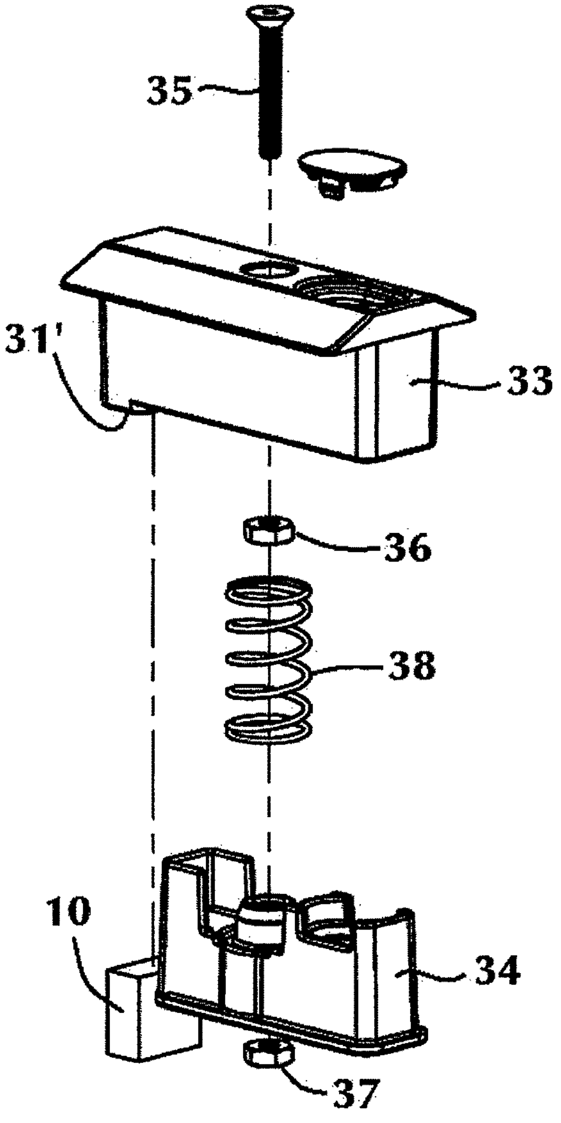
FIG. 21 is an exploded, perspective view of an adjustable strike according to an embodiment of the present invention.
Figure 22:
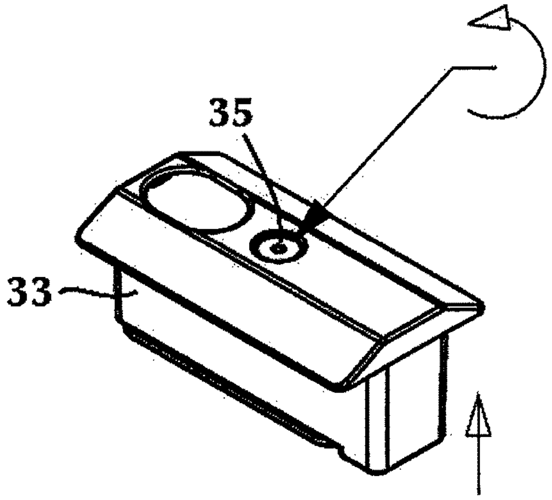
FIG. 22 is a perspective view of the adjustable strike shown in FIG. 21, in a fully retracted position.
Figure 23:
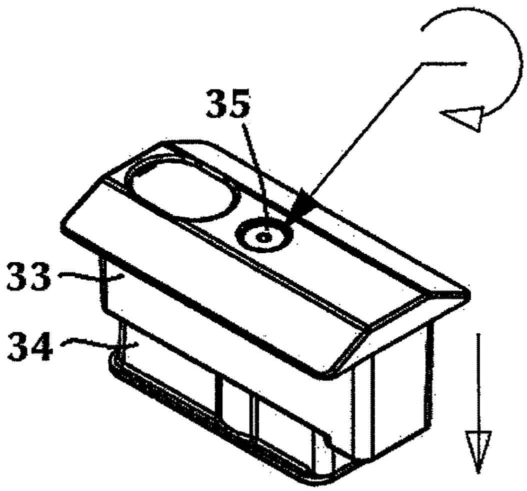
FIG. 23 is a perspective view of the adjustable strike shown in FIG. 21, in a fully extended position.
Figure 24:
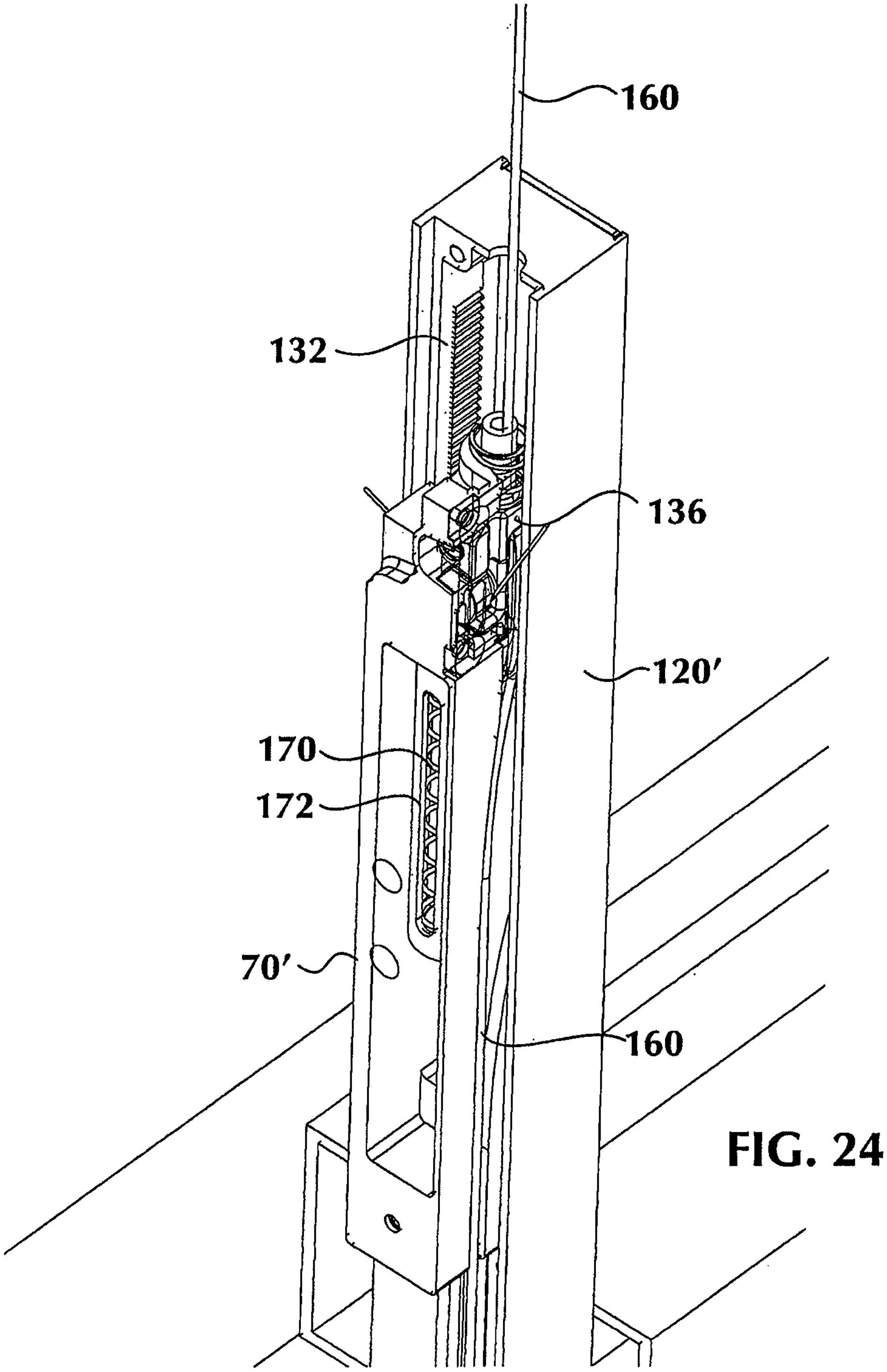
FIG. 24 is a perspective view of the back drive subassembly and bolt spring carrier of an embodiment of the present invention, showing a flexible connector or cable extending through the lock mechanism.

Referring again to FIG. 10, and as more particularly shown in FIGS. 21-23, the shoot bolt assembly may further include an adjustable or collapsible strike 30' in the bottom of the door or window frame for retaining magnet 10 and receiving the triggered bolt 60 or 60'. Strike 30' is comprised of a strike top 33 and base 34. Magnet 10 may be mounted within opening 31' in an underside of strike top 33, which is biased away from base 34 by spring 38 and limited by adjustment screw 35 and nut 37. Adjustment of screw 35 and nut 37 allows for vertical translation of strike top 33 along screw 35, allowing for height adjustment of the profile of the strike 30', as necessary. As shown in FIG. 21, screw 35 is captured to strike top 33 by nut 36. It should be understood by those skilled in the art that a screw/nut configuration is not required to capture adjustment screw 35 to strike top 33, and that other known retention features may also be used in connection with or in addition to screw 35, such as retention clips or other retention features integrated within strike top 33. FIG. 22 shows the adjustable strike 30' in a fully retracted position, where rotation of screw 35 in a counter-clockwise direction allows for increased height adjustment of the strike profile, while FIG. 23 shows strike 30' in a fully extended position. One benefit of an adjustable or collapsible strike 30' is to allow for magnets 10, 20 to remain in close proximity no matter the adjustment of the door or window panel. Moreover, the amount of adjustment of the panel needed over time is greatly reduced, in that the strike 30' can be adjusted to accommodate wear.

FIG. 27 depicts a flow chart describing one method of assembly of the lock mechanism or bolt assembly shown in FIGS. 10-26. At step 100, a recess for receiving an actuator is formed in the door or window panel, or a component thereof, such as by forming a cutout of an aluminum or other material hollow extrusion used as a stile for the panel. A flexible connector such as a cable or rope (or multiple cables) is then passed through a concealed channel in the stile or other route interior to the panel (step 101). An actuator, such as a concealed lever or handle, is then installed into the actuator recess formed in the panel (step 102). The flexible connector or cable (or multiple cables), being accessible at the extent of the concealed channel or stile, is inserted into the shoot bolt mechanism, which may then be installed into a second formed recess in the panel (steps 103 and 104). The cable is then tensioned to operation and secured to the shoot bolt mechanism (steps 105 to 106). Optionally, at step 107, any excess cable or rope may be trimmed, if necessary. It should be understood by those skilled in the art that the steps of the method may be performed in any order, for example, the actuator may be installed after the flexible connector or cable is inserted into the shoot bolt mechanism, or alternatively, the flexible connector or cable may be attached to the shoot bolt and then secured to the actuator mechanism.

The locking mechanism of the present invention may be used in connection with an actuator or lever operator for retracting the bolt. From an extended position, bolt 60 or 60' may be returned to the retracted position to allow for opening of the enclosure through actuation of a lever or handle associated with the door of window panel, such as the concealed lever or handle described herein.

Figure 28:
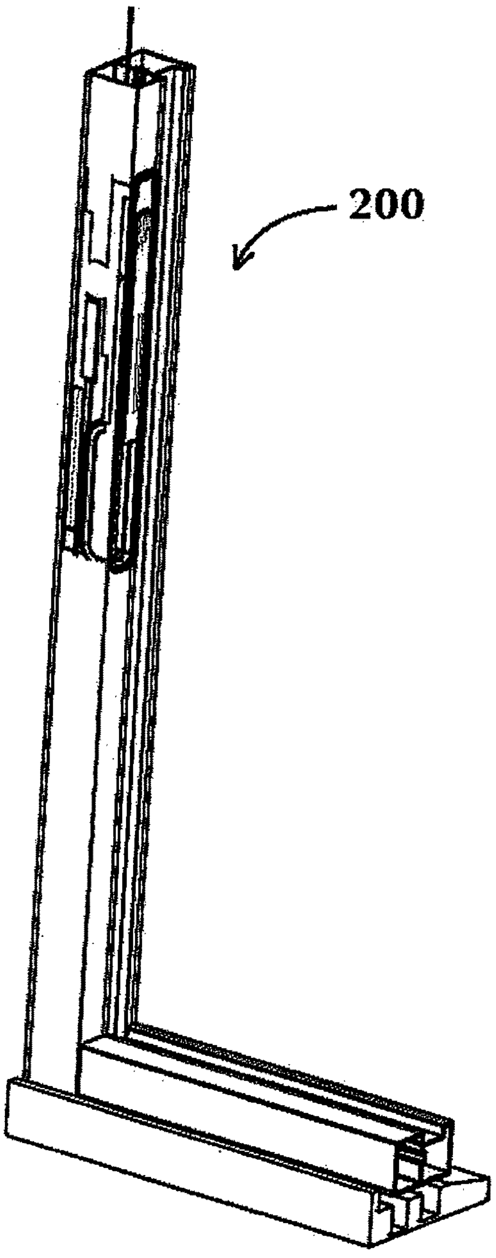
FIGS. 28 and 29 are perspective views of an embodiment of a door or window panel including a concealed actuator for actuating the lock mechanism of the present invention.
Figure 28A:
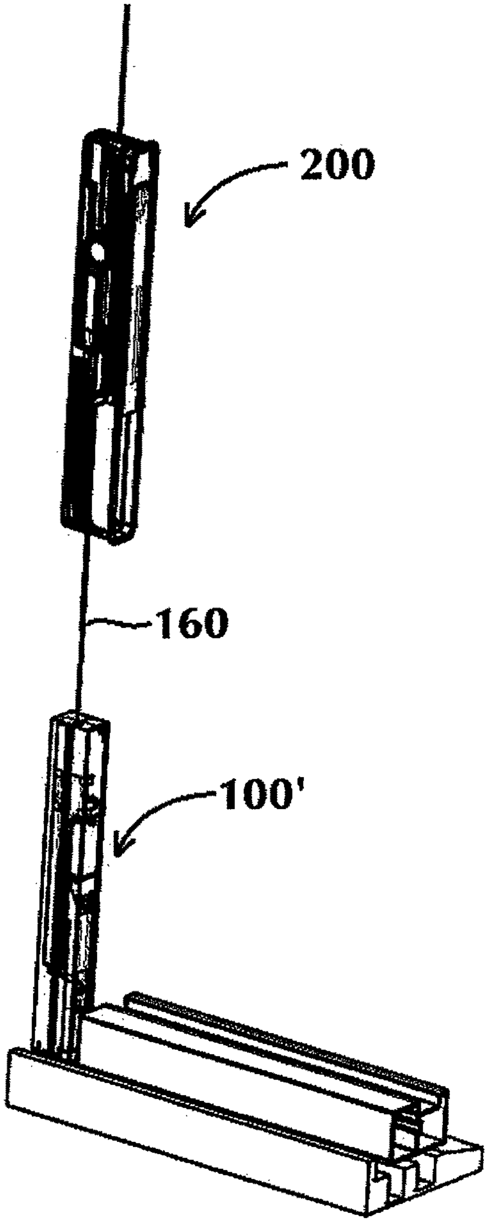
In FIGS. 28A and 29A, the panel has been removed to more particularly depict the actuator and lock mechanism, respectively.
Figure 29:
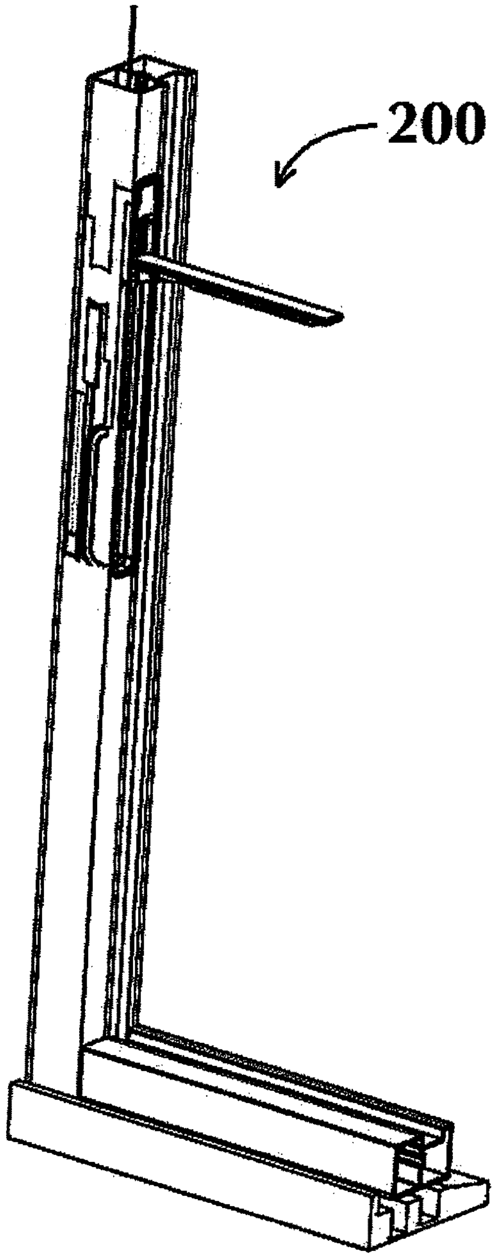
Figure 29A:
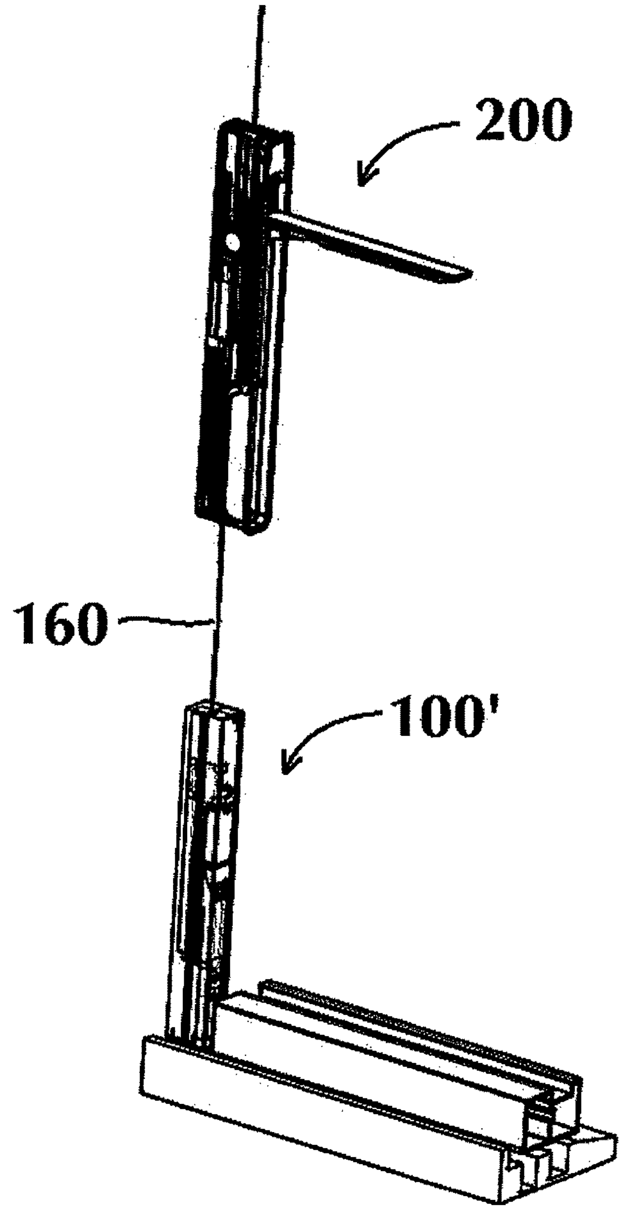

FIGS. 28 and 29 show an embodiment of a door or window panel including a concealed actuator 200 for actuating the lock mechanism 100 or 100' of the present invention. The actuator or shoot bolt retractor assembly may be received and concealed in a recess formed in the door or window panel, or a component thereof, such as by forming a cutout of an aluminum or other material hollow extrusion used as a stile for the panel. A pliable connector such as a cable, wire, or rope (or multiple cables) which can receive a tension force, and can transmit a compression force, is then passed through a concealed channel in the stile or other route interior to the panel. The pliable connector or cable (or multiple cables), being accessible at the extent of the concealed channel or stile, is inserted into a shoot bolt mechanism, which may be installed into a second formed recess in the panel. The cable is then tensioned to operation and secured to the shoot bolt mechanism.

Flexible connector or cable 160 is tensioned and secured to actuator 200, such that actuation of the handle or lever pulls cable 160, moving slack block 136 upward to disengage pawl 138 from gear 134*b*, allowing for free rotation of gears 134*a,b*, and further allowing for retraction of bolt spring carrier 70' and bolt 60 or 60' upwards and out of engagement with the strike, as described above. It should be understood by those skilled in the art that the concealed lever or handle disclosed herein and shown in FIGS. 28 and 29 is only one example of an actuator that may be used in connection with the locking mechanism of the present invention, and that other now known or later developed types of actuators are contemplated to be within the scope of the present invention.

FIGS. 30-33C depict an exemplary embodiment of the concealed actuator or lever operator assembly of the present invention. A handle is used to operate and retract shoot bolts on a pivot panel, folding panel, or end panel. The operator utilizes a lever on a two bar linkage to drive a series of rack and pinion gears to create a mechanical advantage to retract and/or extend shoot bolts, as described above and shown in FIGS. 10-26, for example. For operating magnetically-triggered shoot bolts, such as those described herein, a spring automatically retracts the operator mechanism to the starting position, optionally with the assistance of gravity. For operating traditional shoot bolts, the lever will remain in the down (i.e., retracted) position when the shoot bolts are extended (locked) and in the upright position when the shoot bolts are retracted (unlocked). In an embodiment for a daily door, the lever or handle is used to open and close the daily door and operates a latch adjacent to the handle. In one or more embodiments, the system may be configured with additional mechanisms to allow locking and unlocking from the interior, operation from the exterior, locking and unlocking from the exterior, and any other combination of mechanisms.

In one embodiment, the operator of the present invention may be used with a mechanical shoot bolt. The lever may be a configurable handle that drives an upper and lower shoot bolt by retracting a cable, or shoot bolts. The primary action is a lever that opens along the same plane as the glass in a door or window system. Integrated in the handle is a latch that is triggered by its proximity to a magnet mounted in the door jamb or an adjacent door, in the case of French-style doors.

In at least one embodiment, the primary mechanism can be configured to not have the locking feature present, such as when the exterior portion of the handle is not present, the locking function is not needed, or the handle is used to unlatch folding panels. The primary handle may be reversible for either left or right hand door systems.

In other embodiments, an exterior handle also utilizes a lever to unlatch the system, and may be restrained with a configurable lock cylinder. It can also have a fixed or retractable handle to assist in closing the door toward the operator. For an inswing door, the handle will be on the outside, whereas for an outswing door the handle will be on the inside. The exterior handle transfers the force via a sliding mechanism that can be utilized from either side of the primary handle.

In at least one embodiment, there may be a push button above the primary interior handle that can be depressed to lock the system. The system can then be unlocked by lifting the primary lever.

The concealed actuator or shoot bolt retractor assembly 200 of the present invention may include a linear actuator in the form of a rack and pinion. In conventional use, the teeth of a circular gear known as the pinion engage teeth on a linear gear bar known as the rack, such that rotational motion applied to the pinion causes the rack to move relative to the pinion, thereby translating the rotational motion of the pinion into linear motion. A lever, optionally restrained by a restrictor, drives a first rack which meshes with a pinion gear, causing the gear to rotate. At the same time, the first rack pulls on a cable attached, for example, to an automatic shoot bolt assembly as described herein. In other embodiments, the cable could be replaced by a mechanical shoot bolt assembly rigidly attached to the drive rack. As the first rack pulls on the cable, the pinion gear meshes with a second (driven) rack, which retracts the cable in a direction opposite of the movement of the first rack, thus retracting the bolt into the panel. In one or more embodiments, during translation of the driven rack, an optional compression spring may be compressed.

Figure 30:
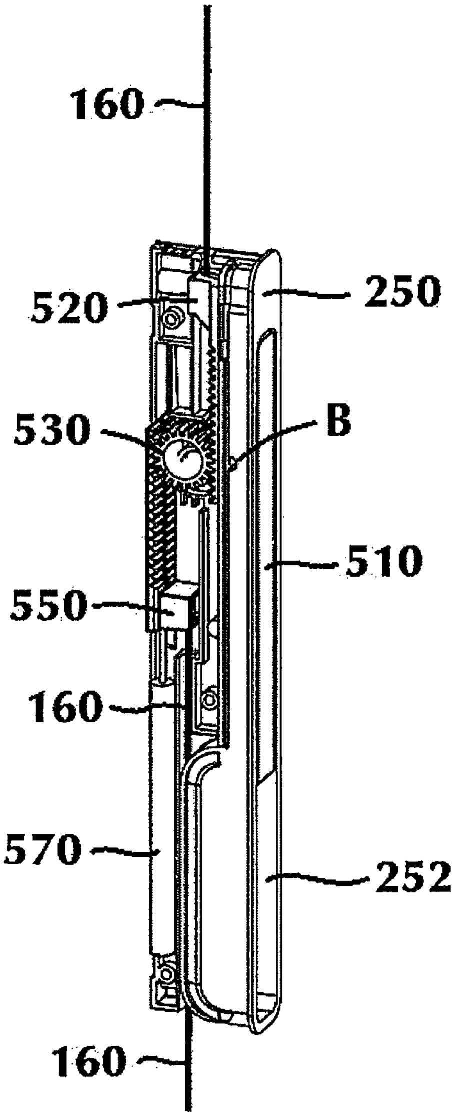
FIG. 30 shows a perspective view of another embodiment of the lever operator assembly of the present invention, with the bolt retractor mechanism in a fully retracted state.
Figure 31:
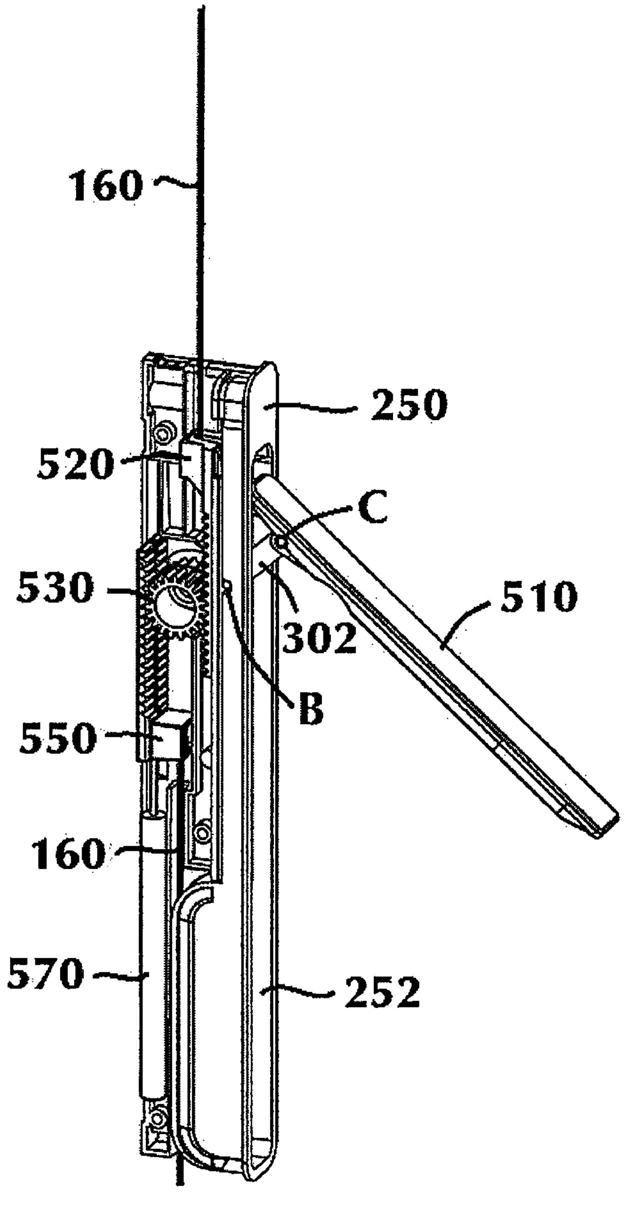
FIG. 31 shows a perspective view of the lever operator assembly of FIG. 30, with the bolt retractor mechanism in a partially retracted state.
Figure 32:
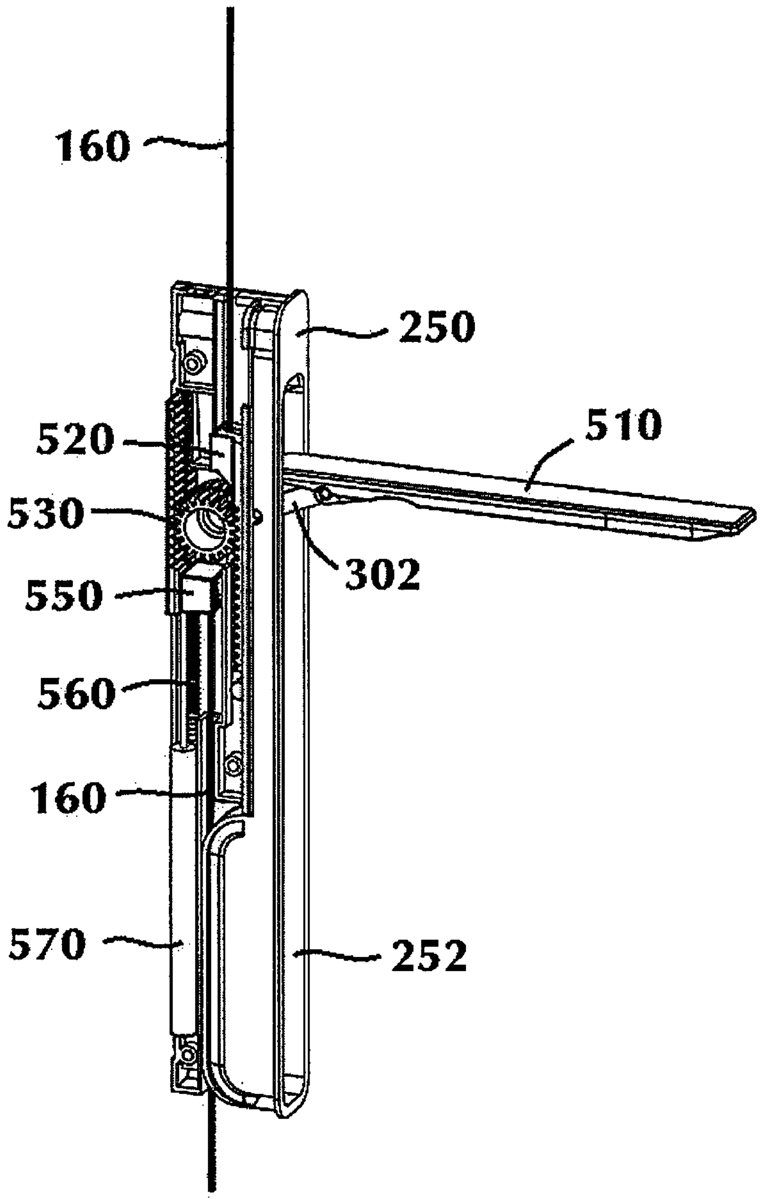
FIG. 32 shows a perspective view of the lever operator assembly of FIG. 30, with the bolt retractor mechanism in a fully retracted state.

Referring now to FIGS. 30-32, in the embodiment shown, a first (drive) rack or slider 520 is disposed vertically along the length of an inner surface of outer housing or casing 250 secured within the door panel. A concealed lever or handle 10 is pivotally connected to the first rack or slider 520 and casing 250, respectively, via a two bar linkage, such that actuation of the lever will translate rack or slider 520 between a first position and a second, tensioned position along a straight vertical path. Handle 510 is pivotable within longitudinal slot 252 in the sidewall of casing 250, such that when in a closed position, handle 510 is substantially flush with the casing profile. In contrast to operator assemblies of the prior art, handle 510 is not directly connected to, nor does it pivot directly about, casing 250 during translation of the first rack 520. Rather, the handle pivots about a hinge point which is offset from the housing or casing.

FIG. 33 depicts the positioning of the two-bar linkage as lever 510 pivots from a concealed or low profile position, to a fully open position, respectively. Housing or casing 250 is not shown, for clarity. As shown in FIG. 33, hinge or pivot pin A is the pivotal junction of first linkage 300 and first rack 520, fixed hinge or pivot pin B is the pivotal junction of second linkage 302 and housing or casing 250, and hinge or pivot pin C is the pivotal junction of the opposite end of linkage 302 and lever 510, such that each linkage bar is permitted to move relative to the other linkage bar. The relationship between the hinged points interplays with the translation of the motion of the handle 510 and rack components 520, 550.

Figure 33B:
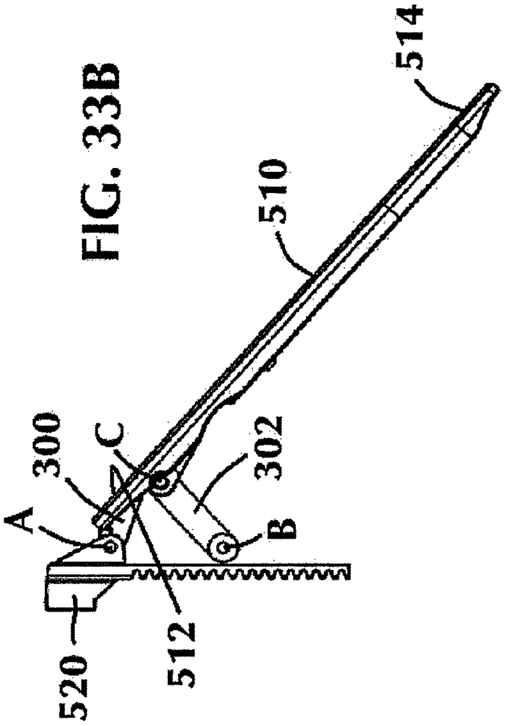
FIGS. 33A to 33C show side plan views of the lever, linkage and racks or sliders of the lever operator assembly of FIG. 25, with the lever pivoting from a closed to a fully open position, respectively. The housing or casing and surrounding hardware components are not shown, to more particularly depict the movement of the two-bar linkage as the lever shifts between open and closed positions.
Figure 33C:
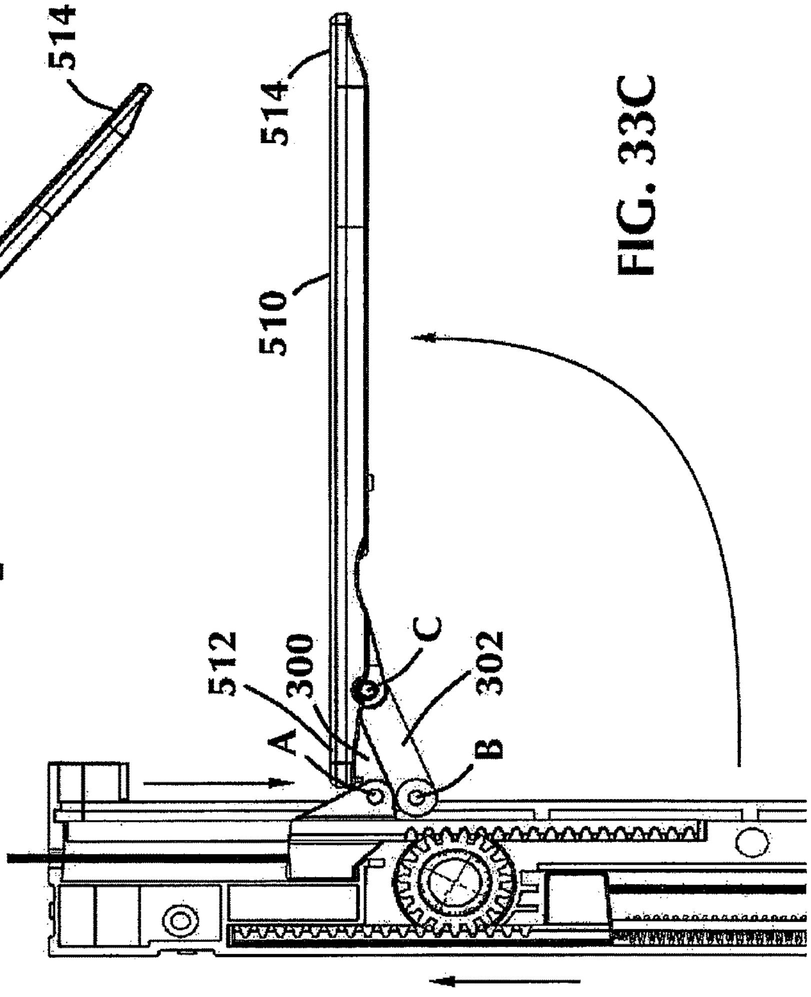
Figure 33A:
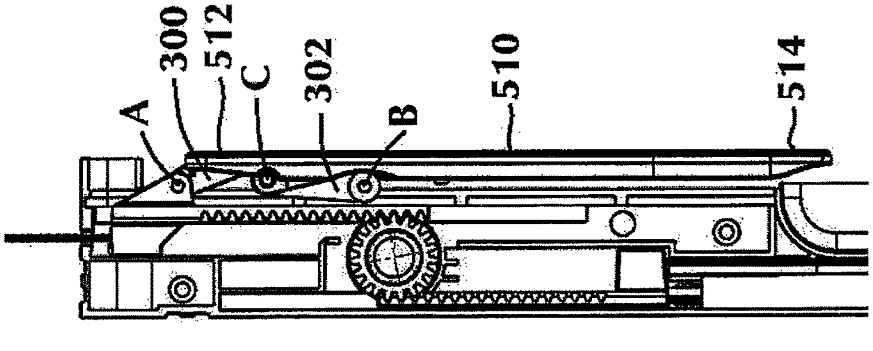

As shown in FIG. 33B, pivot pin A is positioned proximate a first end 512 of handle 510 at a free end of angled, fixed linkage 300 and pivot pin C is preferably positioned at an intermediate point on handle 510 between the handle endpoints at a distance closer to casing 250 than the handle's grip portion end 514. This allows for greater mechanical leverage by a user when pulling handle 510 upwards or pushing handle 510 downwards. Fixed pivot pin B pivotally joins linkage 302 to casing 250 at a point below pivot pins A and C along a vertical axis when handle 510 is in the concealed or closed position. Each pivot pin may be a rivet or other rotatable, pivoting attachment. Linkage 300 is fixed at an angle relative to handle first end 512, while linkage 302 is permitted to pivot at each end thereof (hinges B and C). As shown in FIG. 33A-33C, collectively, the two-bar linkage allows handle or lever 510 to move over a wide operating angle and return to a concealed flush or low profile position (FIG. 33A). As handle 510 moves to either end of its travel, the two-bar linkage design moves hinges A and C relative to fixed pivot point B.

As shown in FIG. 33A, when handle 510 is in the concealed or closed position, hinge A is at its furthest point from fixed pivot pin B along a vertical axis, and hinge C is offset transversely from a vertical line of action between hinges A and B. As handle 510 moves to the open position, as shown in FIGS. 33B and 33C, hinge C shifts transversely from the vertical over the handle's length of travel as hinge A is gradually drawn closer to fixed pivot pin B, causing rack 520 to shift longitudinally downward within slot 252 along casing 250, perpendicular to the axis of rotation of the handle 510, as the handle rotates from a concealed to an open position. This allows handle 510 "clearance" to rotate about its pivot points without requiring extra depth to the casing, and in fact, reducing the depth of the casing, making the actuator assembly more flush with the panel.

As shown in FIGS. 33A-33C, and in contrast to the prior art, handle 510 is not directly connected to, nor does it pivot directly about, casing 250 during translation of the first rack 520, rather the handle pivots about hinge C which is offset from the casing via the two-bar linkage. This contributes to the concealed or low profile design of the actuator mechanism.

Referring again to FIGS. 30-32, rack 520 meshes with pinion gear 530, thereby causing the pinion gear to rotate. At the same time, rack 520 pulls on cable 160, which extends through a concealed channel or stile in the panel and is attached to automatic shoot bolt assembly 100 or 100'. Pinion gear 530 further meshes with a second (driven) rack or slider 550, which retracts and applies tension to cable 160 in a direction opposite of the movement of rack 520. In other embodiments, pinion gear 530 may be, but is not limited to, a helical gear, a Bevel gear, a Miter gear, a double helical gear, or any other gear that couples the drive rack 520 to the driven rack 550. It should be understood by those skilled in the art that a single pinion gear, as shown in the Figures, is sufficient to provide the desired motion; however, the addition of more pinion gears would distribute the load across more teeth on the racks, providing an increased working load.

As described herein, cable 160 may be attached to an automatic shoot bolt assembly, such as assembly 100 or 100', such that manual retraction of the shoot bolt via rotation of handle or lever 510 is permitted. Rack 550 travels along a straight vertical path in a direction opposite the direction of travel of rack 520, and is coupled to rack 520 via pinion 530 such that rack 550 moves in a second direction as rack or slider 520 moves. During translation of the second rack 550 in an upward direction, spring 560 is compressed, resisting the rotational motion of lever 510 (FIG. 32). When the lever is released, spring 560 is allowed to extend and causes the shoot bolt retractor assembly, and therefore lever 510, to return to its initial position (FIG. 30).

Spring 560 is shown in FIG. 32 connected to a bottom end of rack or slider 550, causing rack 550 to return to its initial position when the spring is extended upon release of handle 510; however, it should be understood by those skilled in the art that the spring may also be connected to any moving component in the shoot bolt retractor assembly to produce the same returning effect. In an embodiment, spring 560 may be a constant force spring, a torsion spring, a clock spring, a power spring, a gas spring or other mechanism that provides a force to oppose the rotational force of lever or handle 510 and return the lever to its initial concealed position upon release.

The direction of travel of racks or sliders 520, 550 is shown in FIGS. 30-32 as being parallel and in opposing directions; however, it should be understood by those skilled in the art that in other embodiments, the direction of travel of either or both racks may be along any plane that lays on the rotational axis of pinion 530.

Moreover, as best seen in FIG. 30, pinion 530 is shown having a rotational axis that is parallel to the pivotal axis of handle or lever 510, such that actuation of handle causes rack 520 to travel linearly in a vertical direction via linkage 300, 302. It should be understood by those skilled in the art that in other embodiments, the axis of pinion 530 may not be oriented in a parallel direction, and may instead be oriented in a direction perpendicular to the axis of rotation of handle 510.

Referring again to FIGS. 30-32, the shoot bolt retractor assembly 200 may further include a damper 570 for reducing the speed with which handle or lever 510 closes. As shown in FIG. 30, damper 570 may be a linear damper adjacent spring 560 and connected to rack 550. In conventional use, a linear damper (whether hydraulic or pneumatic) is used when a load is in constant contact with the damper and the operator wants a smooth deceleration in either the compression or tension direction. Here, the load generated by the second rack or slider 550 as spring 560 is compressed is in constant contact with damper 570, and as lever or handle 510 is released to return the bolt retractor or actuator to its initial position (FIG. 30), damper 570 provides a force to oppose the closing force of spring 560 which is proportional to the closing velocity of the lever 510, thus reducing the closing speed. It should be understood by those skilled in the art that a linear damper connected to rack 550 as shown in FIGS. 30-32 is only one means of reducing the closing speed of the handle or lever, and that in other embodiments, a damper may be connected to any moving component in the system to produce the same or similar damping effect, such as a rotary damper connected to the pinion 530, linkage 300, 302 or handle 510.

In another embodiment, the shoot bolt retractor assembly may include only one rack or slider which applies tension to one or more cables. In such a configuration, the cable or cables may be run through a pulley to produce motion in a direction other than the direction of travel of the rack or slider.

In still another embodiment, the shoot bolt retractor assembly may include one or more linkages coupling the opposing first and second racks or sliders 520, 550 instead of a pinion gear 530.

In still yet another embodiment, the housing or casing may include a pair of slots allowing for a shoot bolt or other rigid connector to move independently from the housing or casing to put the connector in tension but not allowing for the connector to be placed under compression. In this embodiment, no pliable connector such as a cable or cables is required, and the shoot bolt retractor assembly is connected directly to the shoot bolt or other rigid connector.

Thus, the present invention achieves one or more of the following advantages. The magnetically-triggered bolt assembly provides an improved means for preventing access to the interior of an enclosure and ensures that the bolt is extended only after the two components, such as a window frame and sill, are in the appropriate position relative to each other. Magnets secured in the strike and trigger mechanism for the bolt, respectively, are oriented and positioned such that they repel one another when in alignment, overcoming the force of a trigger spring which normally biases the trigger in a downward direction, and pulling a locking shuttle away from the bolt, thereby allowing a compressed bolt spring to release and fire the bolt downward into the pocket of the strike. The bolt assembly further includes an adjustable or collapsible strike, allowing for magnets in the strike and trigger mechanism to remain in close proximity no matter the adjustment of the door or window panel, and a support collar for distributing load from the bolt to the casing, allowing for lower cost of materials during manufacture. The bolt assembly further provides improved protection against tampering by preventing back driving of the bolt during operation. The present invention further provides an improved concealed lever operator for a bolt assembly which utilizes a lever on a two bar linkage to drive a series of rack and pinion gears to create a mechanical advantage to retract and/or extend shoot bolts.

While the present invention has been particularly described, in conjunction with specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A lever operator for applying a tension force to one or more pliable connectors, comprising:

a casing;

first and second sliders disposed within the casing, the first and second sliders translatable between first and second relative positions;

at least one linkage coupling the first slider to the second slider, such that translation of the first slider in a first direction causes the second slider to move in a second direction different than the first direction;

a first linkage arm fixedly attached at one end to the casing at a first pivot point, and pivotally attached at the other end to a lever or handle at a second pivot point;

a fixed linkage arm extending at an angle proximate one end of the lever or handle, the fixed linkage arm comprising a third pivot point;

the lever or handle in pivotal communication with the first slider at the third pivot point, and in pivotal communication with the first linkage arm at an intermediate point on the handle at the second pivot point, such that when the lever or handle is rotated from a first position to a second position, the third pivot point translates toward the first pivot point on the casing along a longitudinal axis; and one or more pliable connectors attached at one end to the second slider, wherein, when the lever or handle is rotated from the first position to the second position, the linkage arm pivots about the first and second pivot points causing the first and second sliders to translate between the first and second relative positions, the second slider applying a tension force to the one or more pliable connectors as the second slider translates to the second relative position.

2. The lever operator of claim 1 further including a spring normally biasing the second slider towards the first relative position, the second slider compressing the spring as the lever or handle is rotated to the second position, and wherein expansion of the spring after release of the lever or handle causes the lever or handle to return to the first position via translation of the first and second sliders from the second relative position to the first relative position.

3. The lever operator of claim 2 further including a damper for reducing closing speed of the lever or handle as the lever or handle is released from the second position and the first and second sliders translate from the second relative position to the first relative position.

4. The lever operator of claim 3 wherein the damper is a linear damper contacting a bottom end of the second slider.

5. The lever operator of claim 1 wherein the first and second sliders are disposed within the casing along parallel axes, and wherein the first direction is opposite of the second direction.

6. The lever operator of claim 1 wherein the first slider is disposed along a first axis and the second slider is disposed along a second axis, the second axis forming an angle with respect to the first axis.

7. The lever operator of claim 1 wherein the first and second sliders comprise racks and the at least one linkage comprises at least one pinion gear coupling the first rack to the second rack.

8. The lever operator of claim 7 wherein the lever or handle is rotatable on an axis that is perpendicular to an axis of rotation of the at least one pinion gear.

9. The lever operator of claim 7 wherein an axis of rotation of the lever or handle is different than an axis of rotation of the at least one pinion gear.

10. The lever operator of claim 1 wherein the third pivot point is positioned proximate a free end of the fixed linkage arm.

11. The lever operator of claim 1 wherein the casing includes a sidewall section having a longitudinal slot, and wherein the lever or handle is pivotable within the longitudinal slot between a concealed position and an open position.

12. The lever operator of claim 1 wherein an opposing end of the one or more pliable connectors is attached to a lock mechanism.

13. A method of operating a bolt assembly, comprising:

providing a first component including a casing; first and second sliders disposed within the casing, the first and second sliders translatable between first and second relative positions; at least one linkage coupling the first slider to the second slider, such that translation of the first slider in a first direction causes the second slider to move in a second direction different than the first direction; a first linkage arm fixedly attached at one end to the casing at a first pivot point, and pivotally attached at the other end to a lever or handle at a second pivot point; a fixed linkage arm extending at an angle proximate one end of the lever or handle, the fixed linkage arm comprising a third pivot point the lever or handle in pivotal communication with the first slider at the third pivot point, and in pivotal communication with the linkage arm at an intermediate point on the handle at the second pivot point; and one or more pliable connectors attached at one end to the second slider and at an opposing end to a bolt displaceable between extended and retracted positions, the bolt mounted to the first component and interengageable with a second component when the first and second components are in a predetermined position relative to each other and the bolt is extended;

moving the first and second components to the predetermined position;

moving the bolt to the extended position to engage the second component;

rotating the lever or handle from a first position to a second position to pivot the linkage arm about the first and second pivot points and cause the first and second sliders to translate between the first and second relative positions;

translating the third pivot point toward the first pivot point on the casing along a longitudinal axis as the lever or handle is rotated from the first position to the second position; and applying a tension force to the one or more pliable connectors by the second slider as the second slider translates to the second relative position to retract the bolt.

14. The method of claim 13 further including a spring normally biasing the second slider towards the first relative position, and wherein the method further comprises:

compressing the spring by the second slider as the lever or handle is rotated to the second position; and causing the lever or handle to return to the first position via translation of the first and second sliders from the second relative position to the first relative position via expansion of the spring after release of the lever or handle.

15. The method of claim 13 wherein the first and second sliders comprise racks and the at least one linkage comprises at least one pinion gear coupling the first rack to the second rack, and further comprising:

rotating the lever or handle from the first position to the second position on an axis that is perpendicular to an axis of rotation of the at least one pinion gear.

16. The method of claim 13 wherein the first and second sliders comprise racks and the at least one linkage comprises at least one pinion gear coupling the first rack to the second rack, and further comprising:

rotating the lever or handle from the first position to the second position along an axis of rotation different than an axis of rotation of the at least one pinion gear.

17. The method of claim 13 wherein the casing includes a sidewall section having a longitudinal slot, and wherein the lever or handle is pivotable within the longitudinal slot between a concealed position and an open position.

* * * * *